United States Patent
Oyama et al.

(10) Patent No.: US 11,694,455 B2
(45) Date of Patent: Jul. 4, 2023

(54) FRAUD CONFIRMATION ASSISTING APPARATUS AND FRAUD CONFIRMATION METHOD INCLUDING A LIGHT SOURCE IRRADIATING AN OBJECT IN THE INVISIBLE WAVELENGTH RANGE AND READ BY A READING SENSOR TO OUTPUT A PLURALITY OF PIECES OF FRAUD CONFIRMATION INFORMATION

(71) Applicants: Tadaaki Oyama, Kanagawa (JP); Masamoto Nakazawa, Kanagawa (JP)

(72) Inventors: Tadaaki Oyama, Kanagawa (JP); Masamoto Nakazawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/574,573

(22) Filed: Jan. 13, 2022

(65) Prior Publication Data
US 2022/0230460 A1 Jul. 21, 2022

(30) Foreign Application Priority Data
Jan. 18, 2021 (JP) ................................. 2021-005728

(51) Int. Cl.
*H04N 1/028* (2006.01)
*G06V 10/143* (2022.01)
(Continued)

(52) U.S. Cl.
CPC ............ *G06V 20/95* (2022.01); *G06V 10/143* (2022.01); *G06V 10/147* (2022.01);
(Continued)

(58) Field of Classification Search
CPC .... G06V 10/143; G06V 10/147; G06V 20/95; G07D 7/0043; G07D 7/005; G07D 7/12;
(Continued)

(56) References Cited

U.S. PATENT DOCUMENTS

| 2016/0078265 A1 | 3/2016 | Pawlik et al. |
| 2016/0078307 A1* | 3/2016 | Pawlik ................... G06V 20/80 |
| | | 235/468 |

(Continued)

FOREIGN PATENT DOCUMENTS

| DE | 10 2018 102 015 A1 | 8/2019 |
| JP | 2001-094705 | 4/2001 |

(Continued)

OTHER PUBLICATIONS

Extended European Search Report dated Jun. 23, 2022 in European Patent Application No. 22151550.5, 7 pages.

*Primary Examiner* — Chad Dickerson
(74) *Attorney, Agent, or Firm* — Xsensus LLP

(57) ABSTRACT

A fraud confirmation assisting apparatus includes a light source, a reading sensor, and processing circuitry. The light source irradiates an object to be read with light in at least an invisible wavelength range. The reading sensor has sensitivity at least in the invisible wavelength range. The processing circuitry performs a reading operation on the object to be read by a combination of the light source and the reading sensor, and outputs a plurality of pieces of fraud confirmation information based on read information output from the reading sensor by the reading operation.

16 Claims, 22 Drawing Sheets

(51) Int. Cl.
*G06V 10/147* (2022.01)
*G06V 20/00* (2022.01)
*H04N 1/00* (2006.01)
*H04N 1/195* (2006.01)

(52) U.S. Cl.
CPC ..... *H04N 1/00005* (2013.01); *H04N 1/02805* (2013.01); *H04N 1/02815* (2013.01); *H04N 1/19584* (2013.01)

(58) Field of Classification Search
CPC ...... G07D 7/128; G07D 7/20; H04N 1/00005; H04N 1/02805; H04N 1/02815; H04N 1/19584; H04N 1/00326; H04N 1/00334; H04N 1/64; H04N 1/44; H04N 1/448; H04N 1/4493; H04N 1/0087
USPC .......................................... 358/484, 1.11–1.18
See application file for complete search history.

(56) References Cited

U.S. PATENT DOCUMENTS

| 2018/0107887 | A1* | 4/2018 | Huber, Jr. | ............ G06V 30/412 |
| 2019/0295351 | A1* | 9/2019 | Goldstein | ........ G06K 19/07749 |
| 2020/0053233 | A1 | 2/2020 | Nakazawa et al. | |
| 2020/0120224 | A1 | 4/2020 | Sasa et al. | |
| 2020/0120228 | A1 | 4/2020 | Ozaki et al. | |
| 2020/0412904 | A1 | 12/2020 | Ohmiya et al. | |
| 2021/0227087 | A1 | 7/2021 | Ozaki et al. | |
| 2021/0281712 | A1 | 9/2021 | Nakamura et al. | |
| 2021/0400159 | A1 | 12/2021 | Oyama et al. | |

FOREIGN PATENT DOCUMENTS

| JP | 2007-006134 | | 1/2007 | |
| JP | 2019-534526 | | 11/2019 | |
| JP | 2020160908 | A * | 10/2020 | ............... G07D 7/12 |

* cited by examiner

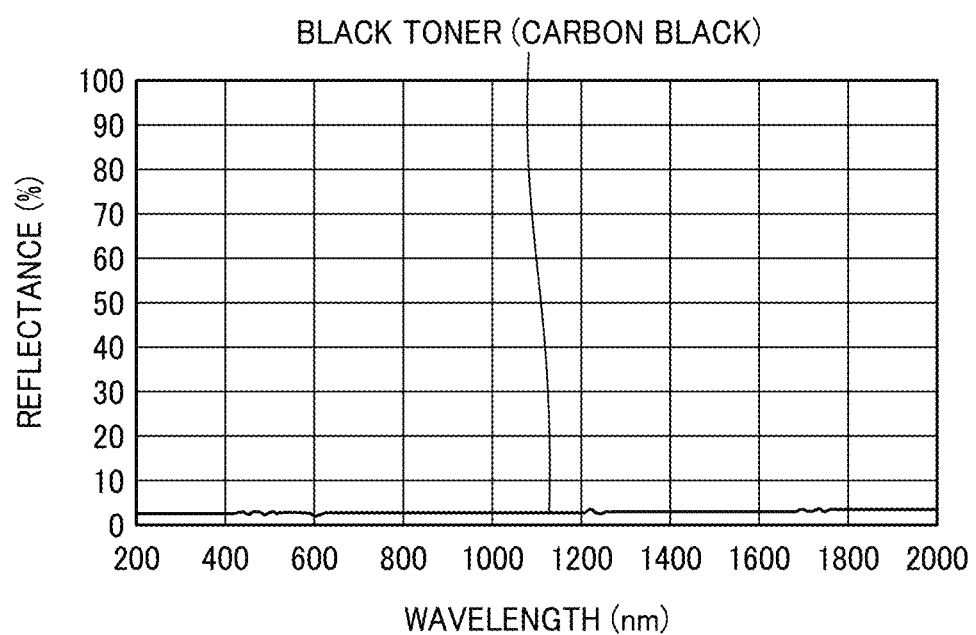

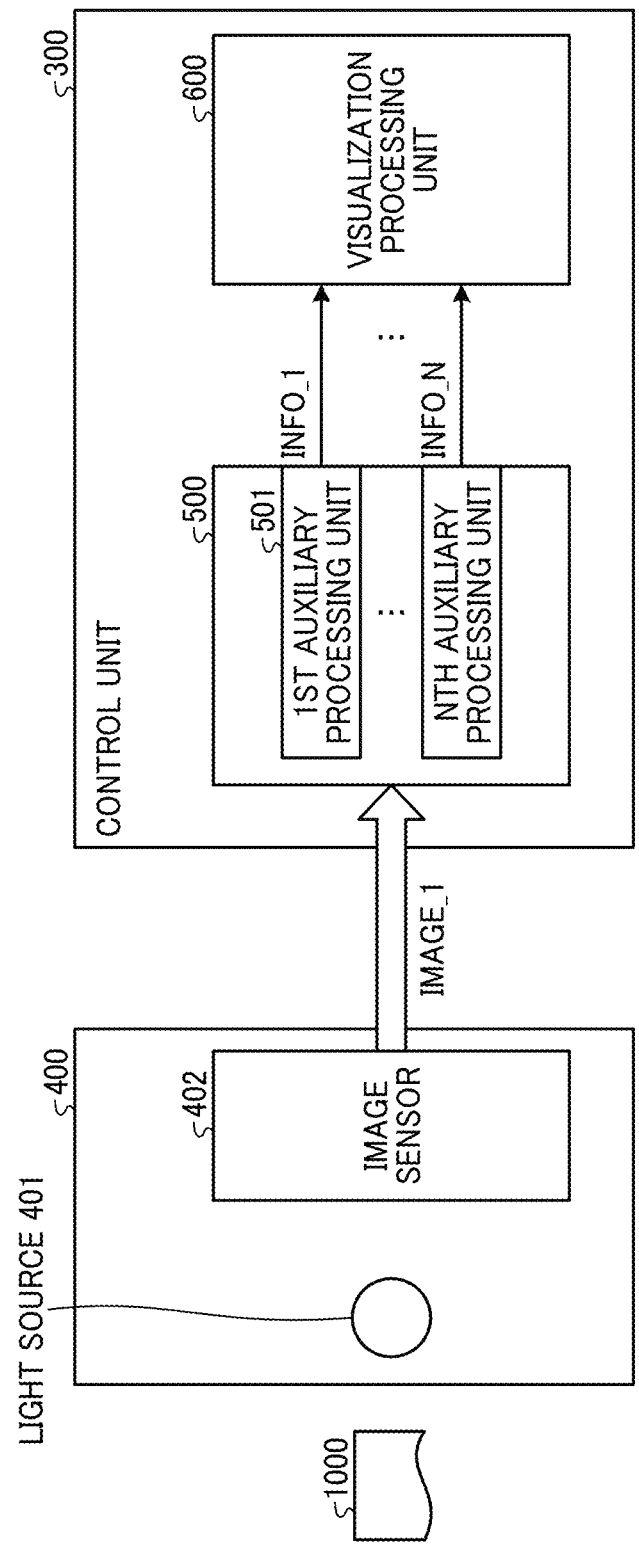

FRAUD CONFIRMATION ASSISTING APPARATUS AND FRAUD CONFIRMATION METHOD INCLUDING A LIGHT SOURCE IRRADIATING AN OBJECT IN THE INVISIBLE WAVELENGTH RANGE AND READ BY A READING SENSOR TO OUTPUT A PLURALITY OF PIECES OF FRAUD CONFIRMATION INFORMATION

CROSS-REFERENCE TO RELATED APPLICATION

This patent application is based on and claims priority pursuant to 35 U.S.C. § 119(a) to Japanese Patent Application No. 2021-005728, filed on Jan. 18, 2021 in the Japan Patent Office, the entire disclosure of which is hereby incorporated by reference herein.

BACKGROUND

Technical Field

Embodiments of the present disclosure relate to a fraud confirmation assisting apparatus and a fraud confirmation method.

Related Art

Conventionally, some fraud prevention techniques have been known that detect unauthorized use such as forgery or tampering of various certificates or documents.

For example, there is known a technique for determining tampering of a document. This technique uses a trained image classifier to determine whether an image has been tampered.

However, in recent years, there are many cases in which a plurality of types of fraud prevention technologies are applied to one certificate, and the awareness of enhancing security has been increasing year by year. Conventionally, different devices are used for various technologies to confirm whether fraud such as forgery or tampering is present. Accordingly, it may take time and labor for confirmation work by a user, thus causing low efficiency.

SUMMARY

According to an embodiment of the present disclosure, there is provided a fraud confirmation assisting apparatus that includes a light source, a reading sensor, and processing circuitry. The light source irradiates an object to be read with light in at least an invisible wavelength range. The reading sensor has sensitivity at least in the invisible wavelength range. The processing circuitry performs a reading operation on the object to be read by a combination of the light source and the reading sensor, and outputs a plurality of pieces of fraud confirmation information based on read information output from the reading sensor by the reading operation.

In another embodiment of the present disclosure, there is provided a fraud confirmation method for confirming a fraud on an object to be read. The fraud confirmation method includes irradiating, acquiring, and outputting. The irradiating irradiates the object to be read with light in at least an invisible wavelength range. The acquiring acquires reading information of the invisible wavelength range of the object to be read by a reading sensor having sensitivity at least in the invisible wavelength range. The outputting outputs a plurality of pieces of fraud confirmation information based on the read information.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 3 is a graph illustrating spectral reflection characteristics of carbon black;

FIG. 4 is a diagram illustrating an example of an apparatus configuration that performs fraud confirmation;

Figure 1:
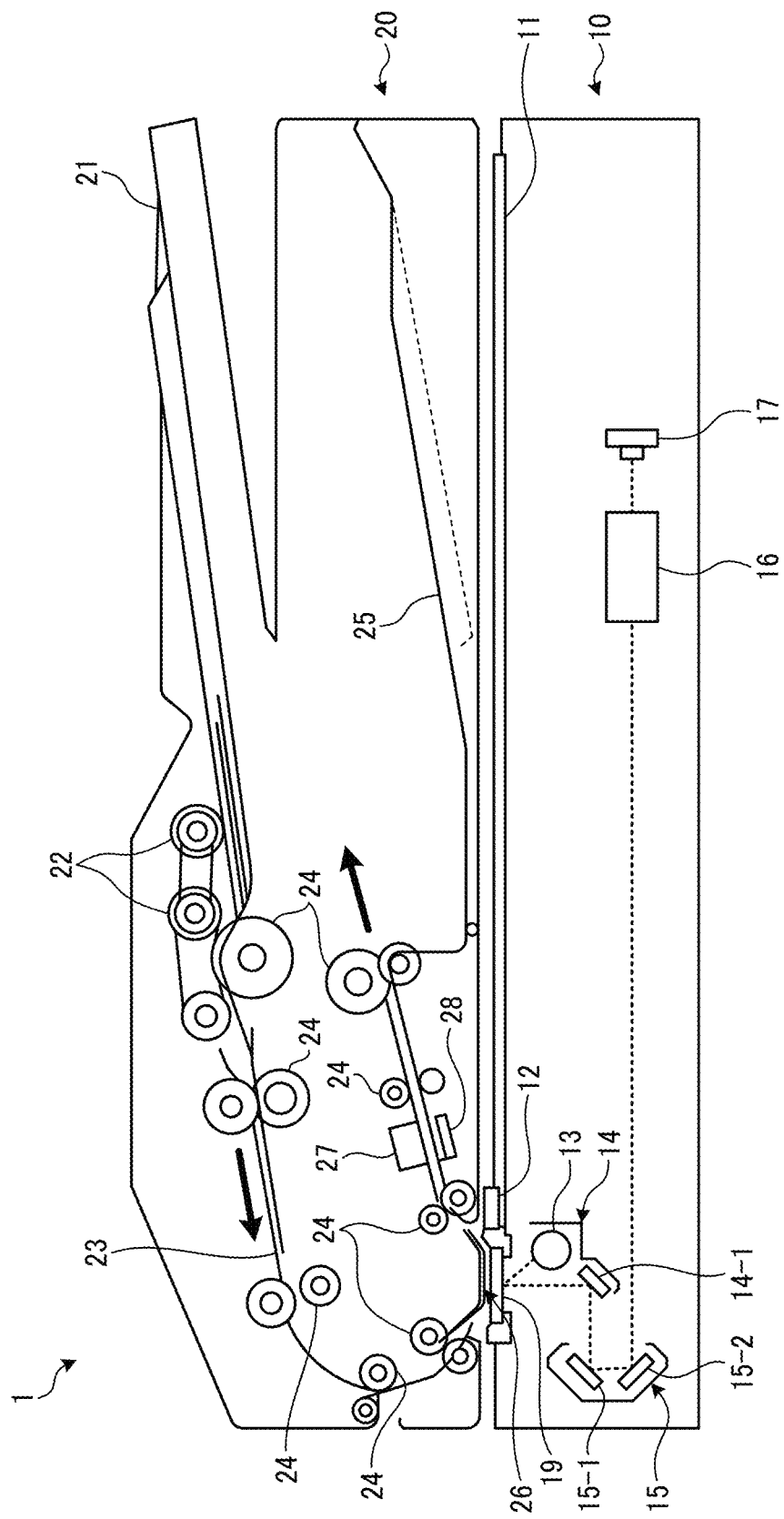
FIG. 1 is a diagram illustrating an example of a configuration of an fraud confirmation assisting apparatus according to a first embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments of a fraud confirmation assisting apparatus and a fraud confirmation method will be described in detail with reference to the accompanying drawings. Hereinafter, as examples of the fraud confirmation assisting apparatus, descriptions are given of an example in which the fraud confirmation assisting apparatus is an image reading apparatus and an example in which the fraud confirmation assisting apparatus is an image forming apparatus. Note that an example in which an image sensor is used as a reading sensor is described below. However, the reading sensor is not limited to an image sensor as long as the reading sensor has a structure in which light is converted into an electric signal. An image (also referred to as a read image) or image information output by the image sensor is an example of "information (or read information)" output by the reading sensor. Further, the fraud confirmation assisting apparatus is not limited to an image reading apparatus or an image forming apparatus, and may be a dedicated apparatus having an assisting function for fraud confirmation. Alternatively, the assisting function for fraud confirmation may be implemented with a device having another function as long as the assisting function for fraud confirmation is applicable to the device.

First Embodiment

FIG. 1 is a diagram illustrating an example of a configuration of a fraud confirmation assisting apparatus according to a first embodiment of the present disclosure. FIG. 1 illustrates an image reading apparatus that is an example of the fraud confirmation assisting apparatus.

An image reading apparatus irradiates an object to be read such as various certificates or documents with light from a light source, and receives light reflected from the object to be read with an image sensor to read an image.

Specifically, in the example illustrated in FIG. 1, an image reading apparatus main body 10 includes an exposure glass 11 on an upper surface of the image reading apparatus main body 10 and a reading unit (first reading unit) inside the image reading apparatus main body 10. For example, a light source 13, a first carriage 14, a second carriage 15, a lens unit 16, and a sensor board 17 are disposed inside the image reading apparatus main body 10. The first carriage 14 has the light source 13 and a reflection mirror 14-1. The second carriage 15 has reflection mirrors 15-1 and 15-2. The image reading apparatus main body 10 includes a control board (corresponding to a control unit 300 illustrated in FIG. 2) and controls the entire apparatus.

The control board moves the first carriage 14 and the second carriage 15, emits light from the light source 13, and sequentially reads reflected light from an object to be read placed on the exposure glass 11 by an image sensor. When the light source 13 emits light, the light reflected by the object to be read is reflected by the reflection mirror 14-1 of the first carriage 14 and the reflection mirrors 15-1 and 15-2 of the second carriage 15 and enters the lens unit 16. The light emitted from the lens unit 16 forms an image on an image sensor (first reading unit) mounted on the sensor board 17. The image sensor is an image sensor such as a charge coupled device (CCD) or a complementary metal oxide semiconductor (CMOS), and converts reflected light from an object to be read into an electric signal to output image information. Note that the light source 13 is not limited to a single light source, and a plurality of light sources may be provided. The image sensor is not limited to one image sensor, and a plurality of image sensors may be provided. The apparatus setting of a combination of these numbers will be described below as necessary. A reference white plate 12 is a member that is read in advance to perform white correction on a read image.

The image reading apparatus 1 illustrated in FIG. 1 is further equipped with an automatic document feeder (ADF) 20 so that an ADF 20 can read objects to be read by a sheet-through method. In the ADF 20, a pickup roller 22 separates a stack of objects to be read one by one from a tray 21 in the ADF 20, and one side or both sides of an object to be read conveyed on a conveyance path 23 by control of various conveyance rollers 24 are read and discharged to an ejection tray 25.

The object to be read is read through a reading window 19. In this example, the first carriage 14 and the second carriage 15 are moved to and fixed at a predetermined home position. When the object to be read passes between the reading window 19 and a background portion 26, the first surface (front surface) of the object to be read facing the reading window 19 is irradiated with light from the light source 13 to read an image. The reading window 19 is a slit-shaped reading window formed on a part of the exposure glass 11. The background portion 26 is a background member.

In the case of double-sided reading of the object to be read, after the object passes by the reading window 19, the second surface is read by a reading module 27 of a second reading unit mounted on the second surface side (back side). The reading module 27 includes an irradiation unit including a light source and a contact-type image sensor serving as a second reading unit. The contact-type image sensor reads reflected light of light emitted to the second surface. The light source is not limited to a single light source, and a plurality of light sources may be provided. The image sensor is not limited to one image sensor, and a plurality of image sensors may be provided. A background member 28 is formed of a density reference member.

The first reading unit and the second reading unit perform shading correction with shading data generated based on the density reference member when the first reading unit and the second reading unit read the object to be read. In the shading correction, the first reading unit and the second reading unit correct, for example, variations in accuracy of each pixel of each reading unit.

Next, a configuration of a control block of the image reading apparatus 1 is described.

Figure 2:
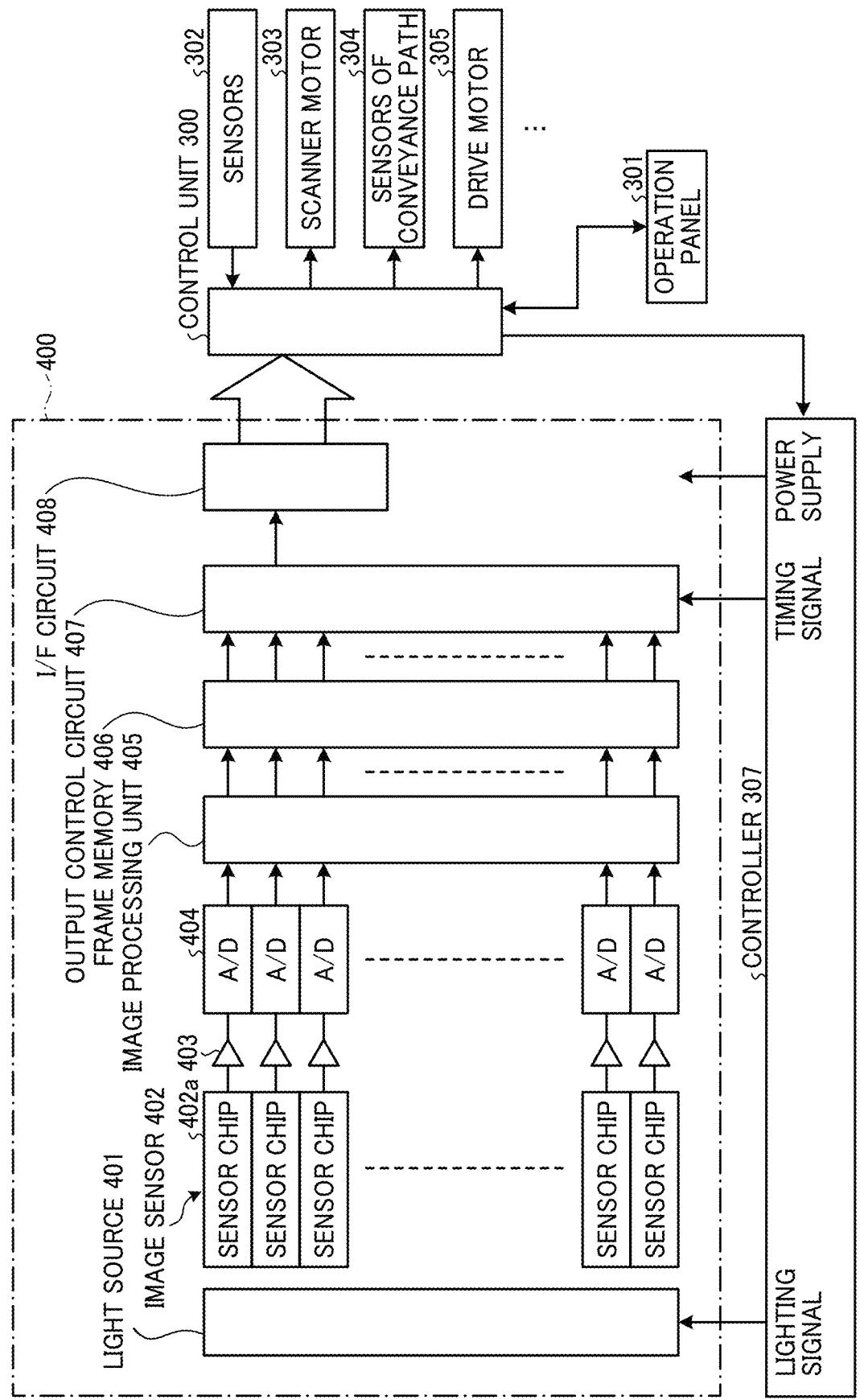
FIG. 2 is a diagram illustrating a configuration of a control block of an image reading apparatus according to an embodiment of the present disclosure.

FIG. 2 is a diagram illustrating an example of the configuration of the control block of the image reading apparatus 1. As illustrated in FIG. 2, the image reading apparatus 1 includes a control unit 300, an operation panel 301, various sensors 302, a scanner motor 303, various motors 304, and a reading unit 400. In addition, various objects to be controlled are connected. The various sensors 302 are sensors that detect an object to be read. The scanner motor 303 is a motor that drives the first carriage 14 and the second carriage 15 of the image reading apparatus main body 10. The various motors 304 are various motors disposed in the ADF 20.

The operation panel 301 is, for example, a liquid crystal display device of a touch screen type. The operation panel 301 receives input operations such as various settings and reading execution (scan execution) from a user through operation keys or touch input and transmits corresponding operation signals to the control unit 300. The operation panel 301 displays various kinds of display information from the control unit 300 on a display screen. For example, the operation panel 301 includes an execution key for a user to perform fraud confirmation of various certificates, documents, and the like. When an input operation of the execution key is performed, the control unit 300 is instructed to execute fraud confirmation processing. Whether to perform fraud confirmation may be selected on a setting screen of the display screen. A setting may be made such that when the scan execution key is operated, the fraud confirmation processing is also executed. An execution result of the fraud confirmation processing is output such that the control unit 300 can visualize the execution result. For example, an execution screen (confirmation screen) of the fraud confirmation processing is displayed on the display screen of the operation panel 301. The data of the confirmation screen may be stored in an external memory or output to an external printer for printout.

In the reading unit 400 illustrated in FIG. 2, an example of a functional block for reading an image is illustrated. Note that the first reading unit and the second reading unit are not limited to the example. The reading unit 400 includes a light source 401, sensor chips 402a, amplifiers 403, analog-to-digital (A/D) converters 404, an image processing unit 405, a frame memory 406, an output control circuit 407, and an I/F circuit 408. Image data (read image) is output from the output control circuit 407 to the control unit 300 through the I/F circuit 408 for each frame. Here, the sensor chips 402a, the amplifiers 403, the A/D converters 404, the image processing unit 405, the frame memory 406, the output control circuit 407, and the I/F circuit 408 are mounted on the sensor board 17 (see FIG. 1). Each sensor chip 402a is a pixel sensor disposed in an image sensor 402.

The reading unit 400 is driven by a controller 307 based on a reading control signal (such as a timing signal) output from the control unit 300. For example, the reading unit 400 turns on the light source 401 based on a turn-on signal from the controller 307 to irradiate the object to be read with light. The reading unit 400 converts light from an object to be read, which forms an image on the sensor surface of the image sensor 402, into an electric signal by each sensor chip 402a and outputs the electric signal.

The reading unit 400 amplifies the electrical signal (pixel signal) output from each sensor chip 402a by the corresponding amplifier 403, converts the analog signal into a digital signal by the corresponding A/D converter 404, and outputs a level signal of the pixel. The image processing unit 405 performs image processing on an output signal from each pixel. For example, the image processing unit 405 performs shading correction on an output signal from each pixel.

After the image processing, each data is stored in the frame memory 406, and a read image is transferred to the control unit 300 via the output control circuit 407 and the I/F circuit 408.

The control unit 300 includes, for example, a central processing unit (CPU) and a memory and executes a reading operation of an object to be read, a process of performing fraud confirmation, and the like by control of the entire apparatus. The processing unit that performs the fraud confirmation or other processing may be implemented by a functional unit that is developed by the CPU executing a predetermined program, may be implemented by hardware such as an application specific integrated circuit (ASIC), or may be implemented such that each of the processing units shares a function. Upon receiving a scan execution operation to which fraud confirmation is applied, the control unit 300 executes fraud confirmation processing during scan execution. For example, the control unit 300 causes the reading unit 400 to perform a reading operation on an object to be read using a combination of a predetermined light source and a predetermined image sensor. The control unit 300 executes one or a plurality of fraud confirmation processing on the read image transferred from the reading unit 400, and visualizes and outputs the result. For example, the control unit 300 displays an execution screen (confirmation screen) of the fraud confirmation processing on the display screen of the operation panel 301. The data of the confirmation screen may be stored in an external memory or output to an external printer for printout.

Next, the configuration of fraud confirmation means is described in detail. In the following, an example of apparatus setting in a case where fraud confirmation is mainly performed will be described. The inventors of the present application have focused on spectral reflection characteristics of carbon black (hereinafter, also referred to as black toner) in an invisible wavelength range, and carried out several methods for enabling the confirmation of a plurality of (in other words, a plurality of types of) frauds by one reading operation using the spectral reflection characteristics. Therefore, first, taking various certificates and documents as examples of objects to be read, the effectiveness of printing such printed surfaces with toner having spectral reflection characteristics in the invisible wavelength range will be described below, and the configuration of the fraud confirmation means will be described in detail. Note that carbon black used for the printing surface is an example. For example, other ink may be used as appropriate as long as the ink exhibit characteristics similar to, even if not the same as, carbon black.

Hereinafter, the term "visible information" refers to information that can be recognized by human eyes under natural light or information that can be recognized by a sensing device such as an image sensor having sensitivity to visible light (light in a visible wavelength range). The term "invisible information" refers to information that cannot be recognized by human eyes under natural light or information that cannot be recognized by a visible light sensing device, for example, information that can be recognized only by a sensing device such as an image sensor having sensitivity to light in an invisible wavelength range such as infrared rays (including near-infrared rays) or ultraviolet rays. In addition, among the apparatus configurations described below, the configuration of the "fraud confirmation assisting apparatus"

in a broad sense also includes information for fraud confirmation that has been provided in advance on the printing surface, and settings such as the number of light sources and image sensors used in the reading unit and the wavelength range.

FIG. 3 is a graph illustrating spectral reflection characteristics of carbon black. As illustrated in FIG. 3, carbon black has a low reflectance for both light in the visible wavelength range and light in the invisible wavelength range. That is, a printed surface printed with black toner of carbon black is read as "black" under both illumination in a visible wavelength range and illumination in an invisible wavelength range.

FIG. 4 is a diagram illustrating an example of an apparatus configuration including a setting for performing fraud confirmation. Although the light source 401 and the image sensor 402 are illustrated in the reading unit 400 of FIG. 4, other configurations such as those illustrated in the reading unit 400 of FIG. 2 are also included. A light source including at least an invisible wavelength component is used as the light source 401 illustrated in FIG. 4. An image sensor having sensitivity in a wavelength region of the light source 401 is used as the image sensor 402. For example, a light source 401 of light including an invisible wavelength range component and a visible wavelength range component is used, and an image sensor 402 having sensitivity in a wavelength range including these components is used. The reading unit 400 reads image information (e.g., image_1) to be used according to the type of fraud confirmation by a small number of reading operations. Here, as an example, a case where reading is performed by one reading operation will be described.

In the example illustrated in FIG. 4, an extraction processing unit 500 and a visualization processing unit 600 correspond to an "output unit". The extraction processing unit 500 includes a plurality of auxiliary processing units 501, extracts an image to be read (e.g., the image_1 in this example) from read images read by one reading operation, and performs processing of the image to be read by the auxiliary processing units 501.

Each auxiliary processing unit 501 performs auxiliary processing for fraud confirmation using the image to be read, and outputs a processing result after the processing as a plurality of pieces of fraud confirmation information indicating whether the object to be read is original information without fraud such as forgery and tampering. The visualization processing unit 600 outputs fraud confirmation information obtained by visualizing each processing result obtained in the auxiliary processing. For example, the visualization processing unit 600 visualizes each processing result and outputs the visualized processing result to the display screen of the operation panel 301. Alternatively, the visualization processing unit 600 visualizes and outputs the processing result as print information so that the processing result can be printed by an external printer.

Figure 5A:
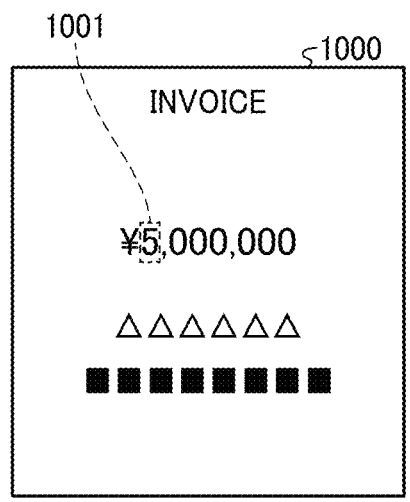
FIGS. 5A and 5B are diagrams illustrating an example of a configuration of a printing surface.
Figure 5B:
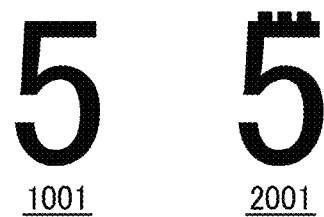

FIGS. 5A and 5B are diagrams illustrating an example of a configuration of a printing surface. FIG. 5A illustrates a configuration of a printing surface of one invoice. FIG. 5A illustrates a printing surface 1000 in a state in which an image printed with black toner is observed with human eyes under natural light. On the printing surface 1000, information to be confirmed by a recipient of the invoice (a person who pays the invoice) is printed with black toner. In this example, various kinds of information (for example, character information and billing amount "¥5,000,000") relating to the content of the print request correspond to information to be confirmed. Triangles and squares in the printing surface 1000 represent the above-described character information other than "INVOICE".

The printing surface 1000 illustrated in FIG. 5A has already been subjected to special processing for preventing tampering that can be observed only with special light. FIG. 5B is a diagram for explaining the special processing performed to prevent tampering. For comparison with FIG. 5A, a numeral "5" (numeral indicated by a dotted line in FIG. 5A) 1001 observed by human eyes under natural light and an image (invisible light image) 2001 obtained by reading the numeral "5" on the printing surface 1000 in an invisible wavelength range are illustrated side by side.

For example, under the rule "all numerals are subjected to special processing", processing with invisible light paint is performed on the upper part of each numeral of the printing surface 1000, and the other parts are printed with black toner. That is, since it is only necessary to notify the contents of billing in general, the contents of billing are printed with black toner that can be confirmed with the human eye under natural light, and the detection of tampering is performed by printing with special paint that cannot be confirmed under natural light and irradiating the special paint with special light (light in an invisible wavelength range).

In this example, when the portion 1001 of the numeral "5" is read in the invisible wavelength range, an invisible image 2001 including dots (corresponding to "comparison information") applied with the invisible light paint on the numeral "5" (corresponding to "original information") is obtained as illustrated in FIG. 5B. Since the number "5" is printed with black toner, the number "5" can be read in the visible wavelength range. That is, the number "5" is recognized as "5" in both the visible image and the invisible image 2001, and the dots are recognized only in the invisible image 2001. The number and arrangement of dots may be changed in accordance with the number. For example, in the case of the numeral "5" illustrated in FIG. 5B, three dots are added at predetermined intervals so that the numeral is not tampered to another numeral by, for example, addition of a line to the numeral. In other examples, the number of dots may be two or less, or four or more.

When the printing surface 1000 illustrated in FIG. 5A is read by the image reading apparatus 1 of FIG. 1 to which the apparatus configuration illustrated in FIG. 4 is applied, an image including dots such as the invisible image 2001 illustrated in FIG. 5B is output from the reading unit 400. The auxiliary processing unit 501 performs, on the invisible image, processing for handling fraud confirmation, for example, emphasizing processing such as enlargement of a dot portion and emphasizing processing of a number without a dot, and outputs a processing result (invisible image) to the visualization processing unit 600. As a result, even in a case where an invoice is forged or a tampering such as addition or deletion of a number is made on the printing surface 1000, the visualization processing unit 600 visualizes and displays an invisible image, thus allow a user to finally determine, with the eyes whether the forgery or the tampering has been made.

Figure 6:
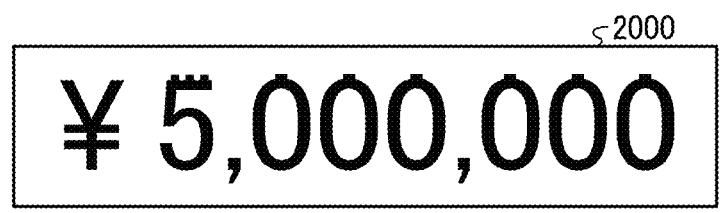
FIG. 6 is a diagram illustrating an example of a processing result displayed on a display screen by a visualization processing unit.

FIG. 6 is a diagram illustrating an example of a processing result displayed on the display screen by the visualization processing unit 600. For example, it is assumed that there is a rule for applying special processing to all of the numbers of the billing amount illustrated in FIG. 5A. In this case, the user confirms from the display of the invisible image 2000 illustrated in FIG. 6 that dots are attached to all of the numbers of the billing amount, and determines whether the scanned invoice is a legitimate document. In the example illustrated in FIG. 6, there are dots over all numbers of the billing amount. Such a configuration allows the user to determine that the invoice is a legitimate document and that the invoice amount has not been tampered with. On the other hand, if there are no dots over all numbers in FIG. 6, it is suspected that the invoice is forged. Further, if there is a dot but there is no numeral at the position of the dot, it is suspected that tampering such as addition or deletion of the numeral has been performed later.

Although it has been described that the auxiliary processing unit 501 performs emphasizing processing such as enlarging a portion where dots are printed in this example, the emphasizing processing is not limited to the enlargement processing and may be other processing as long as it is emphasizing processing that allows a user to easily determine fraud.

In the present embodiment, as an example of the printing surface, the example is described in which characters and numerals are printed with black toner and a dot or dots are applied to each numeral with an invisible paint. In other embodiments, the dots may be printed using an invisible paint when characters and numerals are printed on the printing surface, or may be added to the printing surface later by, for example, a seal.

In addition, although the dots are added to all of the billing amount in this example, such dots may be added in association with, for example, a character or the like as long as there is a portion in which tampering is to be prevented. Although dots are added as tampering prevention marks (corresponding to "original information") in the above-described example, embodiments of the present disclosure are not limited to the dots. For example, other symbols, figures, or the like may be used as the tampering prevention marks.

In addition, in the present embodiment, an example has been described in which a function is provided as "assistance" so that whether there is fraud can be finally confirmed and determined with the human eye. In other embodiments, for example, automatic determination may be performed using an automatic recognition technique such as optical character recognition (OCR), and the result may be output. However, in the case of a certificate, an invoice, or the like with legal effectiveness, visual confirmation is mandatory depending on an object. In such a case, the apparatus may provide functions up to "assistance" so that the final decision is made by a human.

As described above, in the present embodiment, the apparatus is configured by applying a rule in which characters and numerals on a printing surface are printed with black toner as an example, and a dot or dots serving as a tampering prevention mark are applied to each numeral with an invisible paint. By applying this rule, the user can confirm at a glance that forgery has been made if the dots cannot be confirmed, and that the dot(s) and the number do not correspond to each other, the user can confirm that the dot(s) and the number are tampered with. Thus, the user can efficiently perform two types of fraud confirmation, i.e., forgery and tampering, without increasing the number of confirmation apparatuses. Further, the emphasizing processing allows the user to check the presence or absence of fraud easily and highly accurately in a short time.

First Modification

Next, a description is given of a first modification for performing a plurality of types of fraud confirmation.

Figure 7:
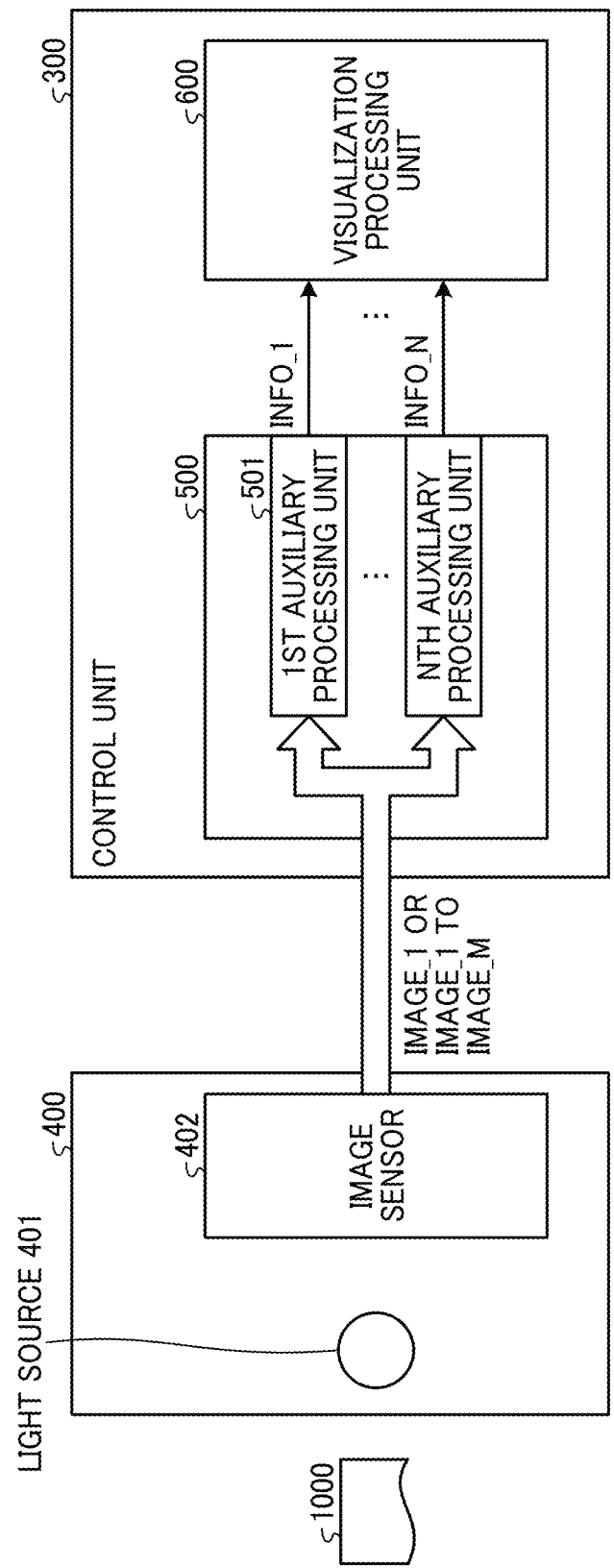
FIG. 7 is a diagram illustrating an example of an apparatus configuration according to a first modification.

FIG. 7 is a diagram illustrating an example of an apparatus configuration according to a first modification. In the apparatus configuration according to the first modification illustrated in FIG. 7, the reading unit 400 reads image information to be used in accordance with the type of fraud confirmation, such as image_1, image_2, . . . , and image_M (M=1, 2, 3, . . . ), by one reading operation as in the above-described embodiment. The extraction processing unit 500 extracts images to be read (image_1, image_2, . . . , and image_M) from read images read by one reading operation, and inputs the extracted image_1, image_2, . . . , and image_M to 1st to Nth (N=1, 2, 3, . . . ) auxiliary processing units 501 to process the extracted images. Here, the extraction processing unit 500 includes the plurality of auxiliary processing units 501 corresponding to the types of fraud confirmation. The plurality of auxiliary processing units 501 also include an auxiliary processing unit 501 serving as an "information conversion unit" that converts image information to be read into determination information so that it can be determined whether the image information is unauthorized with the user's eyes according to the type of fraud confirmation. The image input to each auxiliary processing unit 501 is any one of the image_1 to the image_M. That is, one auxiliary processing unit 501 converts first image information into first determination information for determining first fraud on an object to be read, and another auxiliary processing unit 501 converts second image information different from the first image information into second determination information for determining a second fraud on an object to be read. In this manner, one image is input to one auxiliary processing unit 501.

The first to Nth auxiliary processing units 501 process the fraud confirmation information applied to the printing surface based on one image of the image_1 to the image_M. The processing result of each of the first to Nth auxiliary processing units 501 are output to the visualization processing unit 600, and the user can check each processing result by the visualization processing unit 600 visualizing each processing result on, for example, a display screen.

As an example, it is assumed that two pieces of fraud confirmation information are applied to the printing surface 1000 of the invoice. One is an image (invisible image) for preventing forgery, and the other is an encoded image for preventing tampering. One of the first to Nth auxiliary processing units 501 performs processing of extracting a forgery prevention image from a read image, and another one of the first to Nth auxiliary processing units 501 performs processing of extracting an encoded image from the read image and decoding the encoded image.

Figure 8:
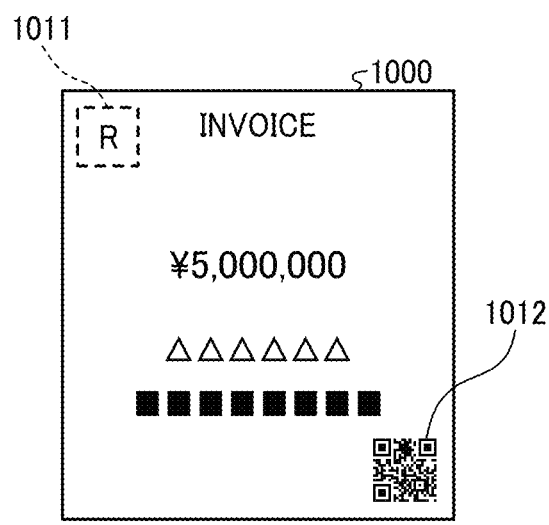
FIG. 8 is a diagram illustrating an example of a configuration of a printing surface.

FIG. 8 is a diagram illustrating an example of a configuration of a printing surface 1000 according to the first modification. An image (invisible image) 1011 for preventing forgery is provided on the printing surface 1000 illustrated in FIG. 8 with an invisible light paint. Although "R" is illustrated as an example of the invisible image 1011, it may be appropriately changed to other characters, numerals, symbols, patterns, marks, or the like as long as the information allows the user to determine that the information is forged. The encoded image is provided with a QR code (registered trademark) 1012 as an example. The QR code 1012 is a QR code obtained by encoding the billing amount "5,000,000" of the printing surface 1000.

Note that the QR code 1012 may be provided with invisible light paint or black toner. Other billing contents such as a billing amount are provided with black toner. That is, on the printing surface 1000 illustrated in FIG. 8, the contents other than the contents provided with the invisible light paint can be confirmed with human eyes under natural light.

When the printing surface 1000 is read by the image reading apparatus 1 of FIG. 1 to which the apparatus configuration illustrated in FIG. 7 is applied, a read image of the display illustrated in FIG. 8 is output from the reading unit 400. One of the first to Nth auxiliary processing units 501 performs extraction processing of the invisible image 1011 included in the read image. For example, processing for extracting and emphasizing the invisible image 1011 from a predetermined position in the read image is performed. The other one of the first to Nth auxiliary processing units 501 decodes the QR code 1012 corresponding to the encoded image into numerical information by a predetermined method. A conventional method may be used for the decoding.

Figure 9A:
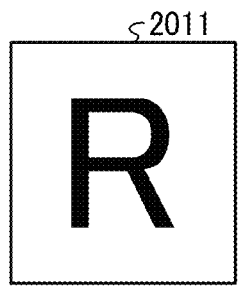
FIGS. 9A and 9B are diagrams illustrating examples of processing results of read images.
Figure 9B:
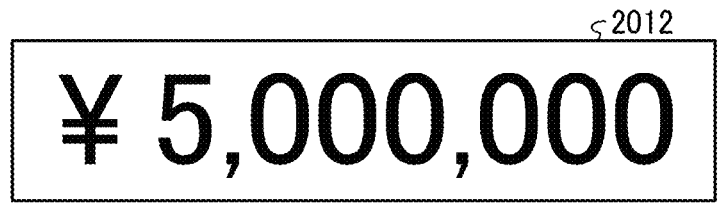

FIGS. 9A and 9B are diagrams illustrating examples of processing results of read images. An image 2011 of the invisible image 1011 is output by the processing of the first auxiliary processing unit 501, and a numerical image 2012 obtained by decoding the QR code 1012 is output by the processing of another auxiliary processing unit 501. The respective results are displayed on, for example, a display screen. In this example, if the image 2011 is "R" illustrated in FIG. 9A, the user determines that the document is a regular document, and if the decoded information matches the billing amount "5,000,000" illustrated in FIG. 9B, the user determines that there is no tampering.

As described above, even when an invoice is forged or tampered with, the extraction processing unit 500 outputs a processing result corresponding to a plurality of types of fraud confirmation by only one reading operation. The respective processing results can be displayed together on one display on the display device or the like of the output destination. In this example, the image "R" for forgery prevention and the billing amount "5,000,000" are displayed. Accordingly, the user can quickly determine the forgery of the invoice by the former and the presence or absence of the tampering by the latter.

Typically, multiple fraud confirmation techniques require a great deal of time, expense, and skill. According to the configuration of the first modification, even when such a certificate or a document is used, the process for checking the plurality of types of frauds is performed by one reading operation. Such a configuration allows the user to perform fraud confirmation easily and with high accuracy in a shorter time than in the past. For example, the effect of increasing the needs for applying a plurality of fraud confirmation techniques and the effect of further increasing the security of certificates and documents can also be expected.

Second Modification

Documents with a high degree of security may require multiple images for single fraud confirmation.

Figure 10:
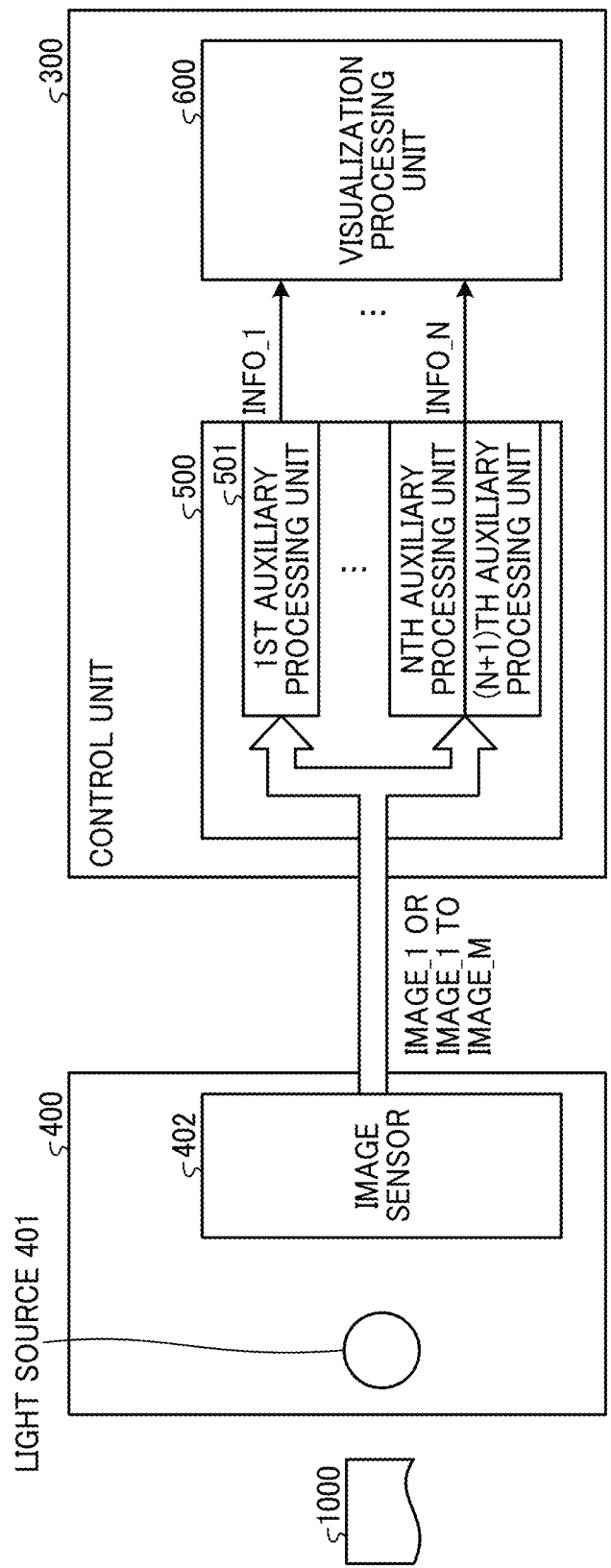
FIG. 10 is a diagram illustrating an example of an apparatus configuration according to a second modification.

FIG. 10 is a diagram illustrating an example of an apparatus configuration according to a second modification in which a plurality of images are used for one fraud confirmation. In the apparatus configuration according to the second modification illustrated in FIG. 10, a plurality of auxiliary processing units 501 are provided for one type of fraud confirmation. As an example, two auxiliary processing units 501, i.e., an Nth auxiliary processing unit and an (N+1)th auxiliary processing unit, are provided for one fraud confirmation. In this configuration, a plurality of images may be input to one auxiliary processing unit 501, or the same image may be input to different auxiliary processing units 501.

As an example, it is assumed that one of the first to Nth auxiliary processing units 501 performs extraction processing of an invisible image in a read image, and the Nth and (N+1)th auxiliary processing units 501 perform decoding processing using an encoded image and an image to be encrypted in the read image.

Figure 11:
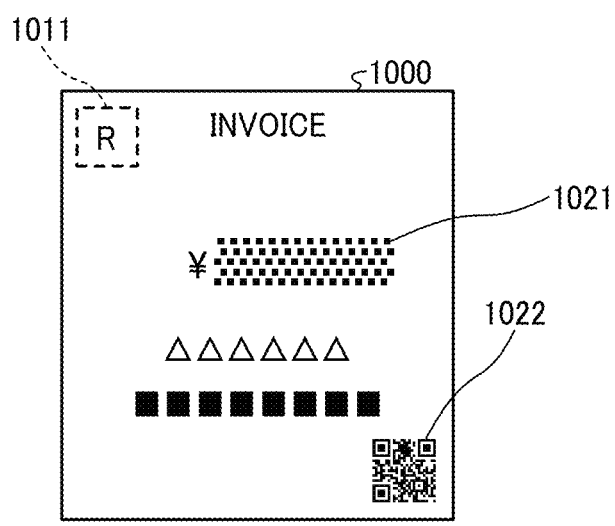
FIG. 11 is a diagram illustrating an example of a configuration of a printing surface.

FIG. 11 is a diagram illustrating an example of a configuration of a printing surface according to the second modification. An image (invisible image) 1011 for preventing forgery is provided on a printing surface 1000 with an invisible light paint. Further, an image (image to be decrypted) 1021 obtained by encrypting an actual billing amount with an encryption key is provided in the billing amount field, and a QR code 1022 serving as the encryption key is provided as an encoded image.

As described above, in the second modification, since the number of the billing amount on the printing surface 1000 is encrypted, the billing amount cannot be easily confirmed or tampered by an outsider. In order to confirm the billing amount, a sequence of numbers of the QR code 1022 is acquired and used as an encryption key. The QR code 1022 may be provided with invisible light paint.

When the printing surface 1000 is read by the image reading apparatus 1 of FIG. 1 to which the apparatus configuration illustrated in FIG. 10 is applied, a read image including each image information illustrated in FIG. 11 is output from the reading unit 400. One of the first to Nth auxiliary processing units 501 performs processing of extracting the invisible image 1011 included in the read image. The Nth auxiliary processing unit 501 decodes the encryption key from the QR code 1022 included in the read image, and the (N+1)th auxiliary processing unit 501 decrypts the billing amount by using the decoded encryption key. That is, in response to one type of fraud confirmation, i.e., confirmation of tampering with the billing amount, two types of auxiliary processing, i.e., decoding processing of the encoded image and decryption of the billing amount by the encryption key obtained from the encoded image are performed.

The processing results are the same as the results in FIGS. 9A and 9B. That is, the first processing result is the image 2011 for forgery prevention that has been extracted from the read image. The second processing result is the image 2012 of the encrypted billing amount obtained by using the two auxiliary processing units 501. In the second modification, since the billing amount is displayed after the encryption is decrypted, the billing amount cannot be forged. Forgery can be easily determined by checking whether the image 2011 is "R".

Third Modification

Next, a description is given of a modification of reading light of the reading unit 400 that reads an invisible image from a printing surface. The light source of the reading unit 400 is described above to employ a light source in a wavelength range having a good reflectance with respect to the invisible light paint. In particular, it is effective to use infrared light for reading an invisible image.

Figure 12:
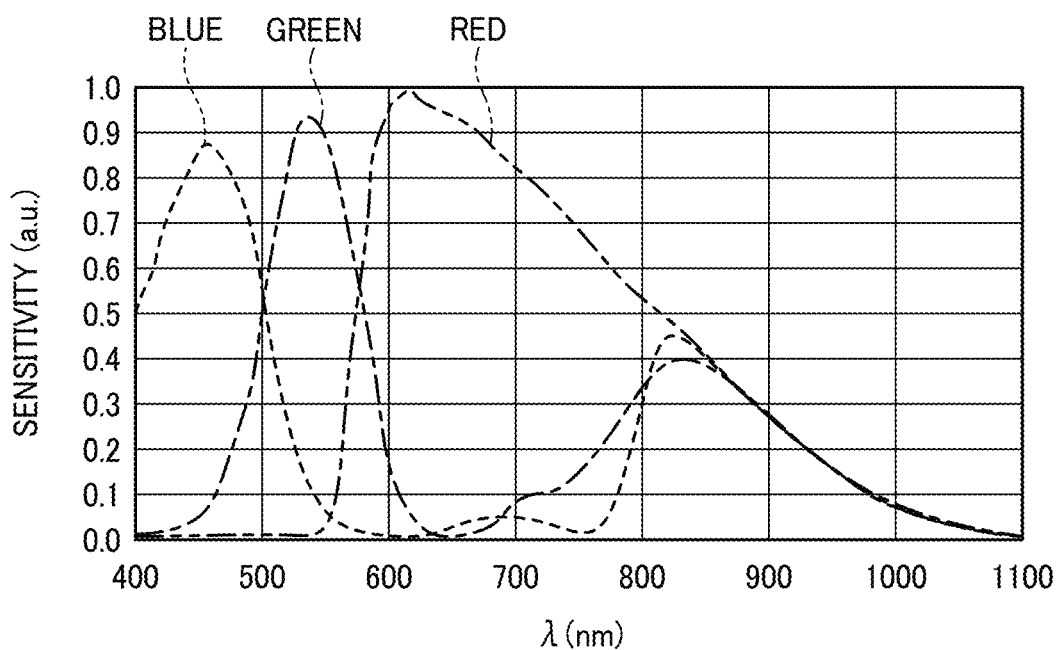
FIG. 12 is a diagram illustrating an example of spectral sensitivity characteristics of an image sensor.
Figure 13:
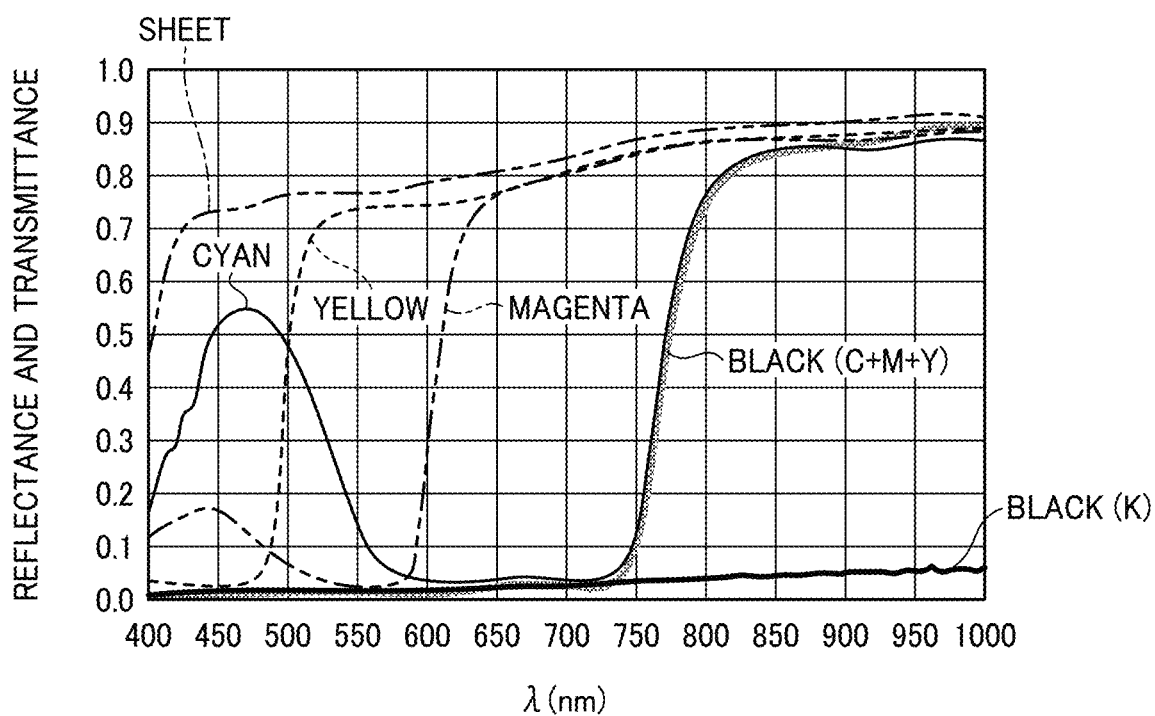
FIG. 13 is a diagram illustrating an example of reflection spectral characteristics observed when color toners are applied to a white paper surface.

FIG. 12 is a diagram illustrating an example of spectral sensitivity characteristics of an image sensor. FIG. 13 is a diagram illustrating an example of reflection spectral characteristics when toners of respective colors (C toner, M toner, Y toner, black (K) toner, and black (C toner+M toner+Y toner)) are applied to a white paper surface.

As illustrated in FIG. 12, silicon constituting a pixel of a general image sensor has sensitivity in an infrared light region (approximately equal to or greater than a wave length of 780 nm) in addition to a visible wave length region (from approximately a wave length of 380 nm to approximately a wave length of 780 nm). That is, although the infrared light region cannot be recognized by the human eye, an image sensor having sensitivity to the infrared light region can read infrared light and can image an invisible paint portion even when an image is irradiated with infrared light. On the other hand, as illustrated in FIG. 13, there is a large difference in reflectance of the infrared light component among the C toner, the M toner, and the Y toner and the black (K) toner. Therefore, using these relationships, a black (K) toner image (halftone dot image) is hidden by an image (halftone dot image) of C toner, M toner, or Y toner) toner image and is read using infrared light. That is, a latent image (black toner image) is hidden by a visible image of C toner, M toner, or Y toner under visible light so as not to be recognized by human eyes, and a latent image (black (K) toner image) is read by infrared light.

With such a configuration, a low-cost and high-security document can be created using a general-purpose toner, and the document can be confirmed using a general-purpose reading sensor. An example is described below as a fourth modification.

Fourth Modification

A public certificate issued in, for example, a convenience store has been subjected to a plurality of different fraud confirmation techniques although a medium is a general white sheet of paper. Since various certificates can be acquired at convenience stores, supermarkets, and the like all over the country, convenience is also high. If the above-described image reading apparatus is used for various certificates and documents in such a form, a plurality of types of fraud confirmation can be performed by a single reading operation, and thus the utility value is further increased.

For example, one of public certificates issued in convenience stores or the like has a scrambled image on the back side. The scrambled image on the back side is obtained by encrypting information on the front side. By decrypting the scrambled image, the normal information on the front side is restored, and the presence or absence of tampering can be confirmed by comparing the restored normal information with the information of the printing surface on the front side. Further, a cherry mark is formed on the back side. The cherry mark is read as a character of "CERTIFICATED" under infrared light. Since the character does not appear in a copy or a document forged by an unauthorized person, the presence or absence of forgery can be confirmed. In the present apparatus, such a plurality of types of frauds can be confirmed by one reading operation.

Then, an example is described in which a public certificate is read by infrared (near-infrared) reading light as described in the third modification and a plurality of fraud confirmation are performed by one reading operation.

Figure 14:
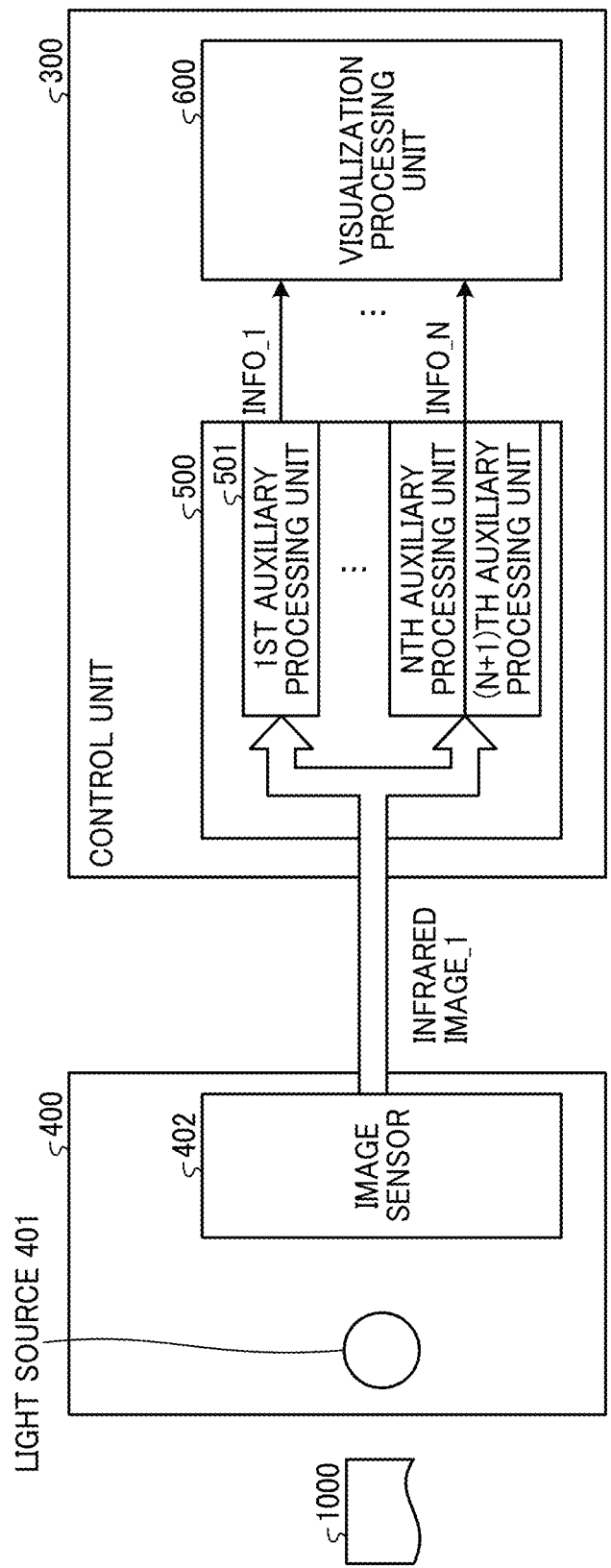
FIG. 14 is a diagram illustrating an example of an apparatus configuration according to a fourth modification.

FIG. 14 is a diagram illustrating an example of an apparatus configuration according to a fourth modification for performing fraud confirmation of a public certificate issued in a convenience store or the like. In the apparatus configuration of the fourth modification illustrated in FIG. 14, the configuration of the third modification is applied to the light source 401 and the image sensor 402 of the reading unit 400, and an infrared image is obtained as a read image from the reading unit 400.

Figure 15:
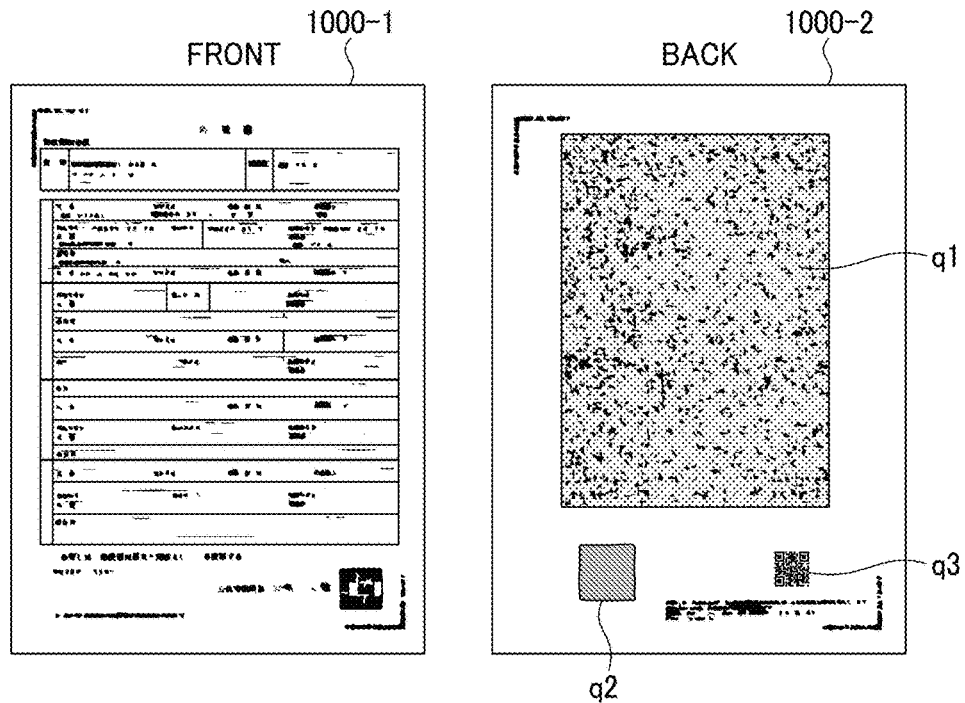
FIG. 15 is a diagram illustrating an example of a configuration of a printing surface.

FIG. 15 is a diagram illustrating examples of the configuration of the printing surface 1000. FIG. 15 illustrates a front side 1000-1 and a back side 1000-2. Information indicating various certification contents is printed on the front side 1000-1. Information for confirming a plurality of types of frauds is printed on the back side 1000-2.

The example illustrated in FIG. 15 illustrates a general form in which a scrambled image q1, an anti-forgery detection image q2, and a QR code q3 are printed as information for fraud confirmation. The scrambled image q1 is decrypted using the encryption key included in the QR code q3. The forgery prevention detection image q2 includes an image of a cherry mark formed by C toner, M toner, or Y toner and a forgery prevention image "CERTIFICATED" formed by the black toner. A latent image of the character "CERTIFICATED" of black toner is formed on a cherry mark, and the character "CERTIFICATED" of black toner is detected by reading an infrared image of the cherry mark. Since various certificates use the wide range of scrambled image q1 as illustrated in FIG. 15, it is assumed that various certificates are read in full size.

When the back side 1000-2 of the printing surfaces 1000 is read by the image reading apparatus 1 of FIG. 1 to which the apparatus configuration illustrated in FIG. 14 is applied, an infrared image of the back side 1000-2 is output as a read image from the reading unit 400.

One of the first to Nth auxiliary processing units 501 performs processing of extracting a black toner image at the position of the cherry mark included in the read image. Another one of the first to Nth auxiliary processing units 501, that is, the Nth auxiliary processing unit in this example decodes the QR code q3 included in the read image into the encryption key, and still another one of the first to Nth auxiliary processing units 501, that is, the (N+1)th auxiliary processing unit decrypts the scrambled image q1 using the encryption key.

Figure 16A:
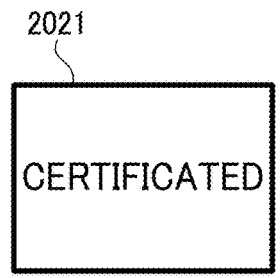
FIGS. 16A and 16B are diagrams illustrating examples of processing results of read images.
Figure 16B:
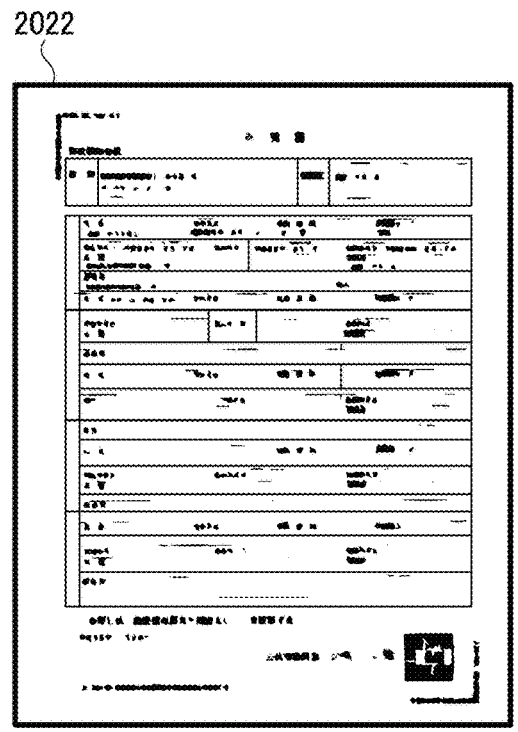

FIGS. 16A and 16B are diagrams illustrating examples of processing results of read images. The first processing result is a black toner image 2021 at the position of the cherry mark. In this example, since the latent image of the character "CERTIFICATED" is formed on the cherry mark with black toner, the legitimacy of the certificate can be easily determined by the display of the character "CERTIFICATED" as illustrated in FIG. 16A. The second processing result is that an image 2022 obtained by decrypting the scrambled image q1 is compared with the information on the front side 1000-1. If the same information is displayed, it can be determined that the information on the front side 1000-1 has not been tampered with.

Fifth Modification

The reading unit 400 may be provided with a configuration for reading a visible image in addition to a configuration for reading an invisible image. For example, in a conventional image reading apparatus, a received certificate may be stored or copied as a visible image read with visible light, and used as a record, evidence, or preliminary document of reception of the certificate. An image reading apparatus or the like used for such a purpose is provided with a fraud confirmation assisting means, thereby achieving further multi-function and high security.

Figure 17:
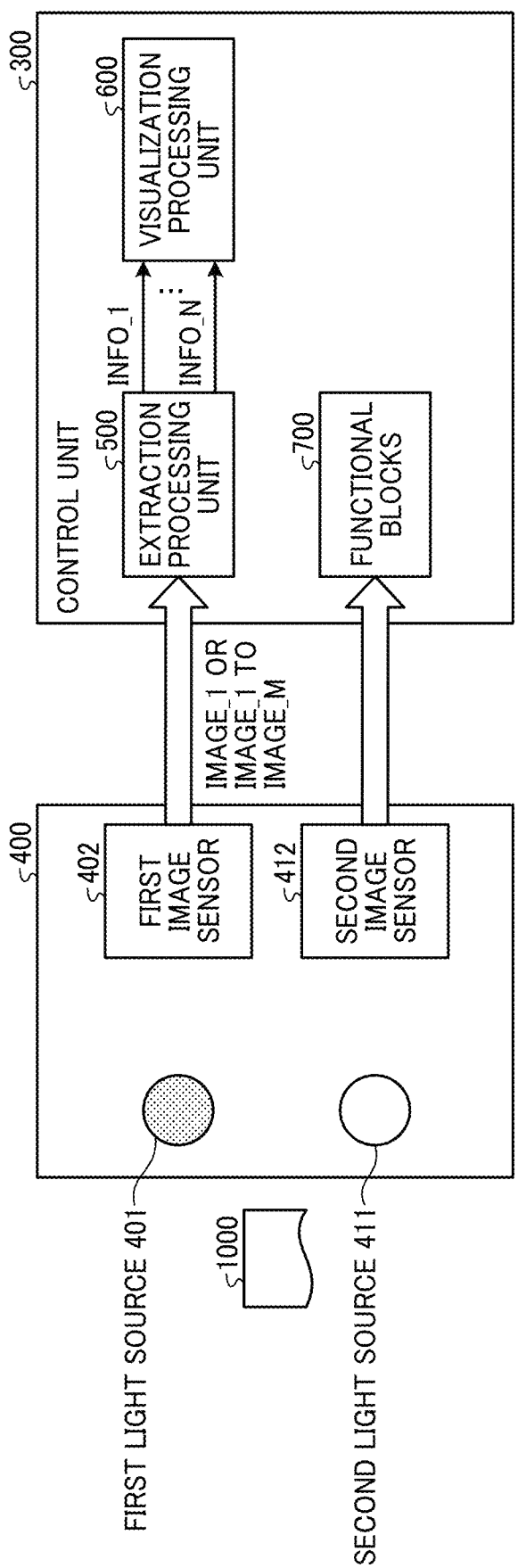
FIG. 17 is a diagram illustrating an example of an apparatus configuration according to a fifth modification.

FIG. 17 is a diagram illustrating an example of an apparatus configuration according to a fifth modification. A first light source 401 and a first image sensor 402 have a configuration for reading an invisible image, and a second light source 411 and a second image sensor 412 have a configuration for reading a visible image. As an example, the second light source 411 is a white light emitting diode (LED).

Figure 18:
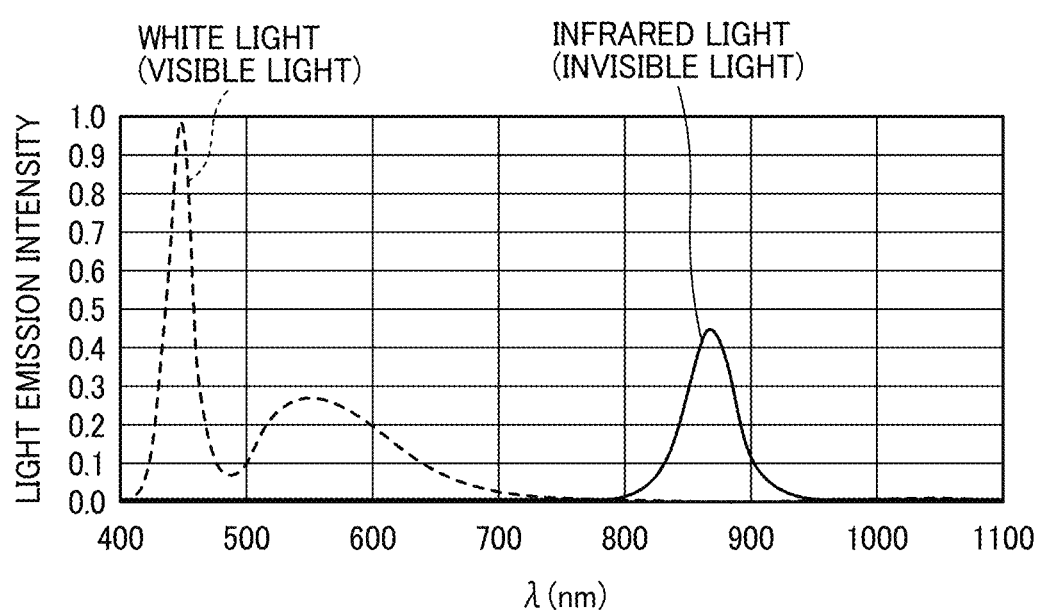
FIG. 18 is a graph illustrating spectral characteristics of a white light source and an infrared light source.

FIG. 18 is a graph illustrating spectral characteristics of a white light source and an infrared light source. Spectral characteristics in a case where an infrared LED is used as the first light source 401 and a white LED is used as the second light source 411 are illustrated in FIG. 18. As the second image sensor 412, an image sensor having sensitivity to light in the visible wavelength range is used.

The visible image is a copy image that is read when the image reading apparatus 1 scans an object to be read, and is provided to and stored in various functional blocks 700 in the related art.

When the object to be read is determined to be forged or tampered, the copy image may be stored together with the invisible image as evidence or may be deleted. In this case, the output of the copy image is desirably disabled. For example, the output of a copy image from the image reading apparatus 1 to an external printer is disabled. On the other hand, when it is determined that there is no forgery or tampering of the object to be read, the output of the copy image may be permitted.

Sixth Modification

Figure 19:
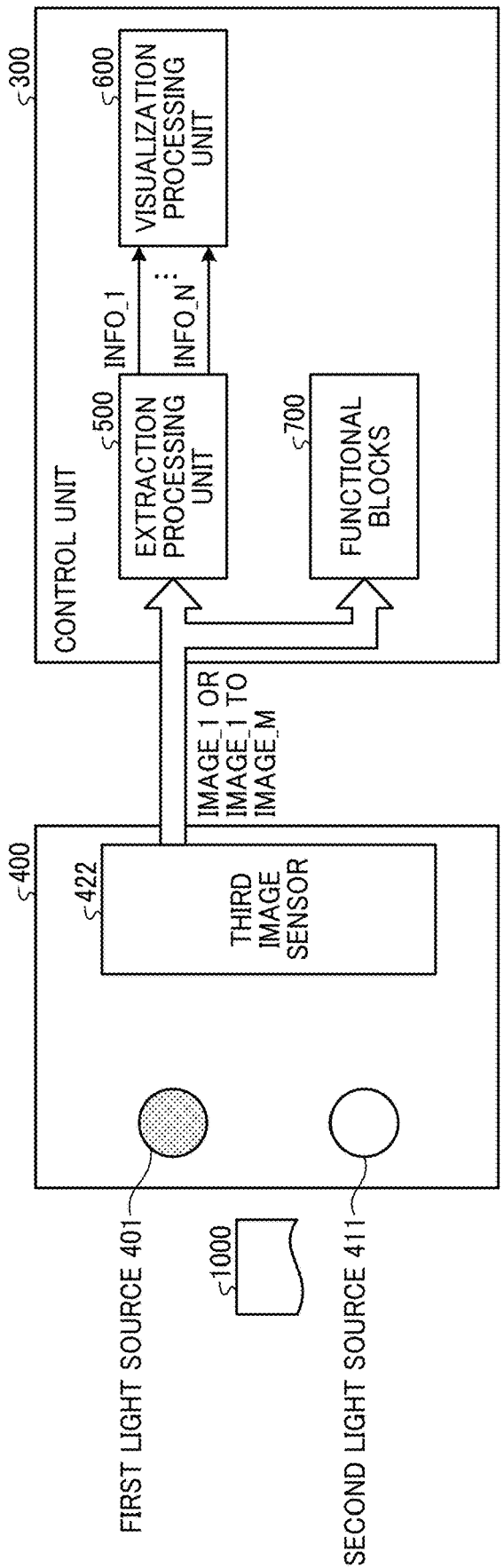
FIG. 19 is a diagram illustrating an example of an apparatus configuration according to a sixth modification.

A single physical image sensor may be used for the first light source 401 and the second light source 411. FIG. 19 is a diagram illustrating an example of an apparatus configuration according to a sixth modification. As illustrated in FIG. 19, an image sensor (third image sensor) 422 serving as a physically single sensor is provided for the first light source 401 and the second light source 411. The third image sensor 422 has spectral sensitivity characteristics in the wavelength range of the first light source 401 and the wavelength range of the second light source 411, and reads reflected light from the printing surface 1000 by the first light source 401 and reflected light from the printing surface 1000 by the second light source 411.

Figure 20:
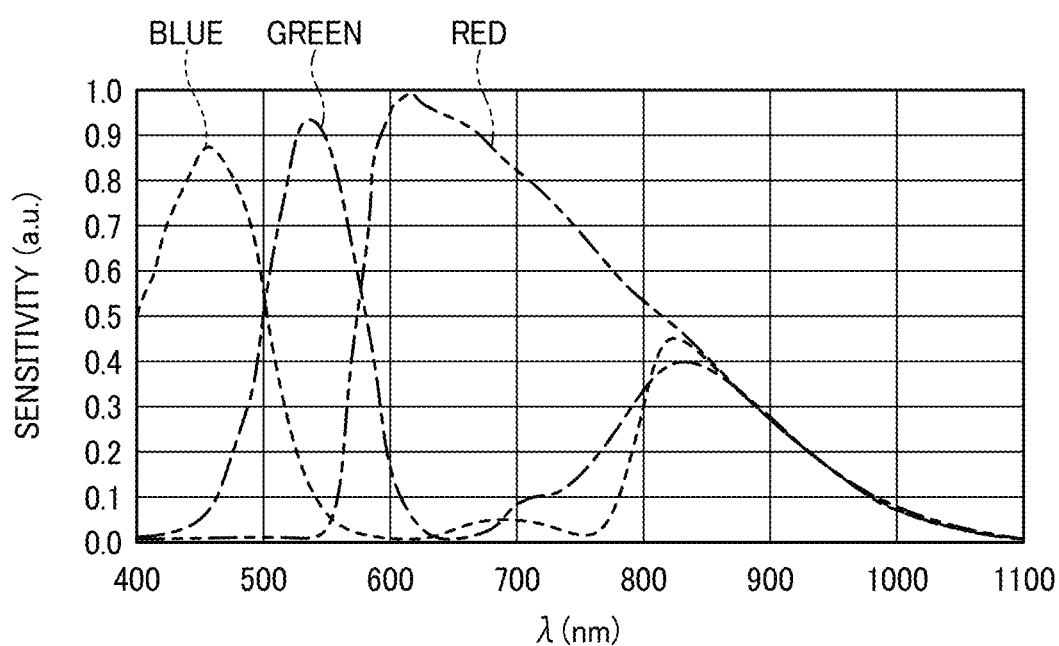
FIG. 20 is a graph illustrating spectral sensitivity characteristics of a third image sensor.

FIG. 20 is a graph illustrating the spectral sensitivity characteristics of the third image sensor 422. The third image sensor 422 has sensitivity to red (R), green (G), blue (B), and infrared (IR) light. Thus, for example, an infrared LED is used as the first light source 401 and a white LED is used as the second light source 411. The light of the white LED is separated into red light, green light, and blue light. In such a configuration, the infrared light LED and the white LED are switched on and off, and the third image sensor 422 sequentially receives red light, green light, blue light, and infrared light. The third image sensor 422 outputs a visible image of an R image, a G image, or a B image, and an infrared image.

Using the single image sensor for outputting an invisible image and a visible image in this manner allows the apparatus to be compact.

Seventh Modification

A description is given of another configuration for outputting an invisible image and an RGB image by using the third image sensor 422.

Figure 21:
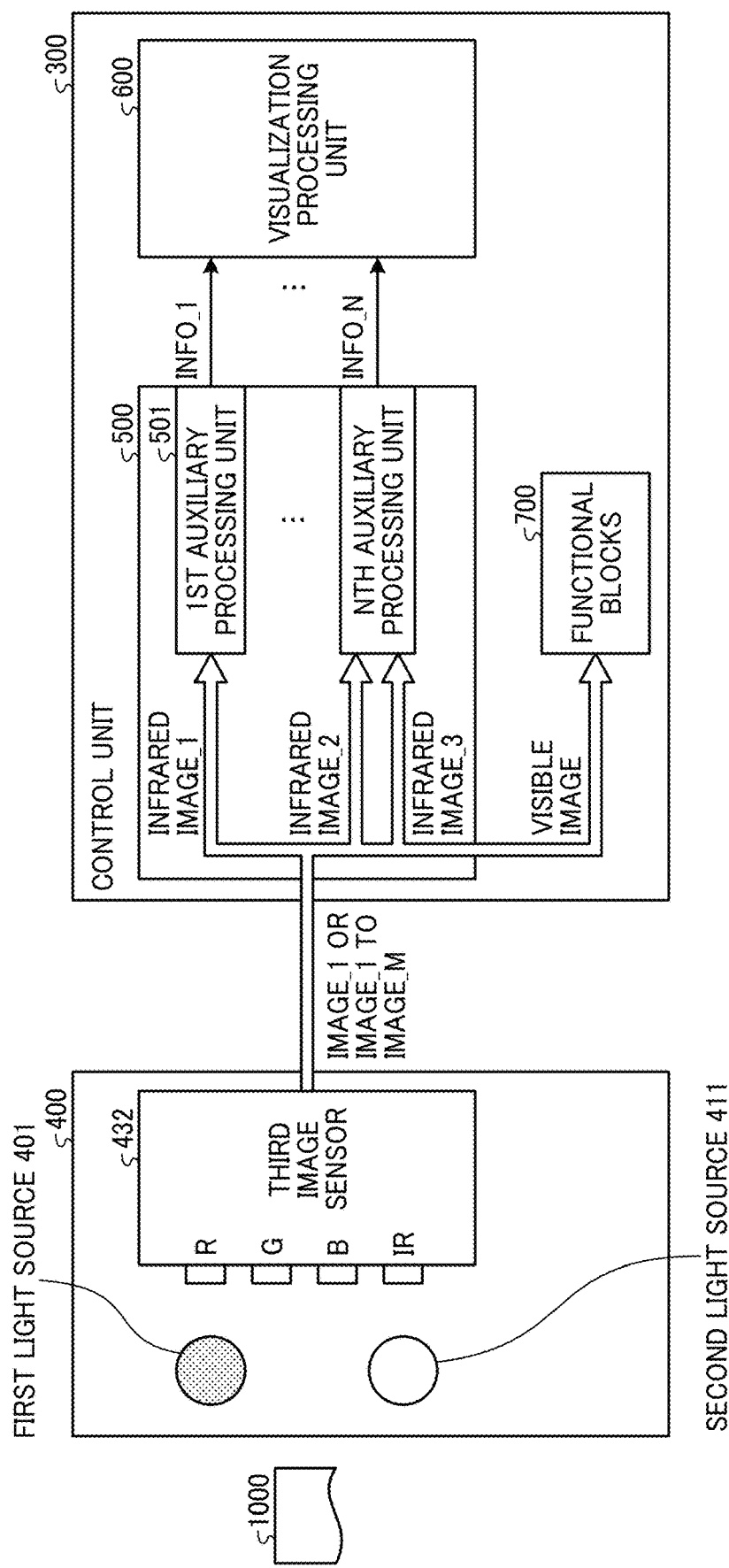
FIG. 21 is a diagram illustrating an example of an apparatus configuration according to a seventh modification.

FIG. 21 is a diagram illustrating an example of an apparatus configuration according to a seventh modification. An infrared LED is used as an example for the first light source 401, and a white LED is used as an example for the second light source 411. The third image sensor 432 is provided with R, G, B, and IR light receivers. Specifically, each light receiver includes a red pixel group, a green pixel group, and a blue pixel group that receive light in a visible wavelength range, and an IR pixel group that receives light in an infrared wavelength range. In this configuration, both the infrared LED and the white LED are turned on, infrared light reflected by the printing surface 1000 is received by the IR light receiver, red light is received by the R light receiver, green light is received by the G light receiver, and blue light is received by the B light receiver.

In addition, the third image sensor 432 outputs visible images read by the R, G, and B light receivers and an infrared image read by the IR light receiver, and the extraction processing unit 500 performs fraud confirmation processing using the infrared image. In the example illustrated in FIG. 21, one of the first to Nth auxiliary processing units 501 performs fraud confirmation processing using one image (infrared image_1) among the infrared images. Another one of the first to Nth auxiliary processing units 501, that is, the Nth auxiliary processing unit in this example, performs fraud confirmation processing using two images (an infrared image_2 and an infrared image 3) in the infrared images. Note that a specific example of the fraud confirmation processing is not described here, to avoid repeating the contents already described.

As described above, in the configuration of the seventh modification, it is not necessary to switch the turn-on of the infrared LED and the white LED, and images read by both light sources can be acquired at a time. Such a configuration can further reduce the labor and time of the user.

Eighth Modification

An invisible image and a visible image may be used for checking fraud.

Figure 22:
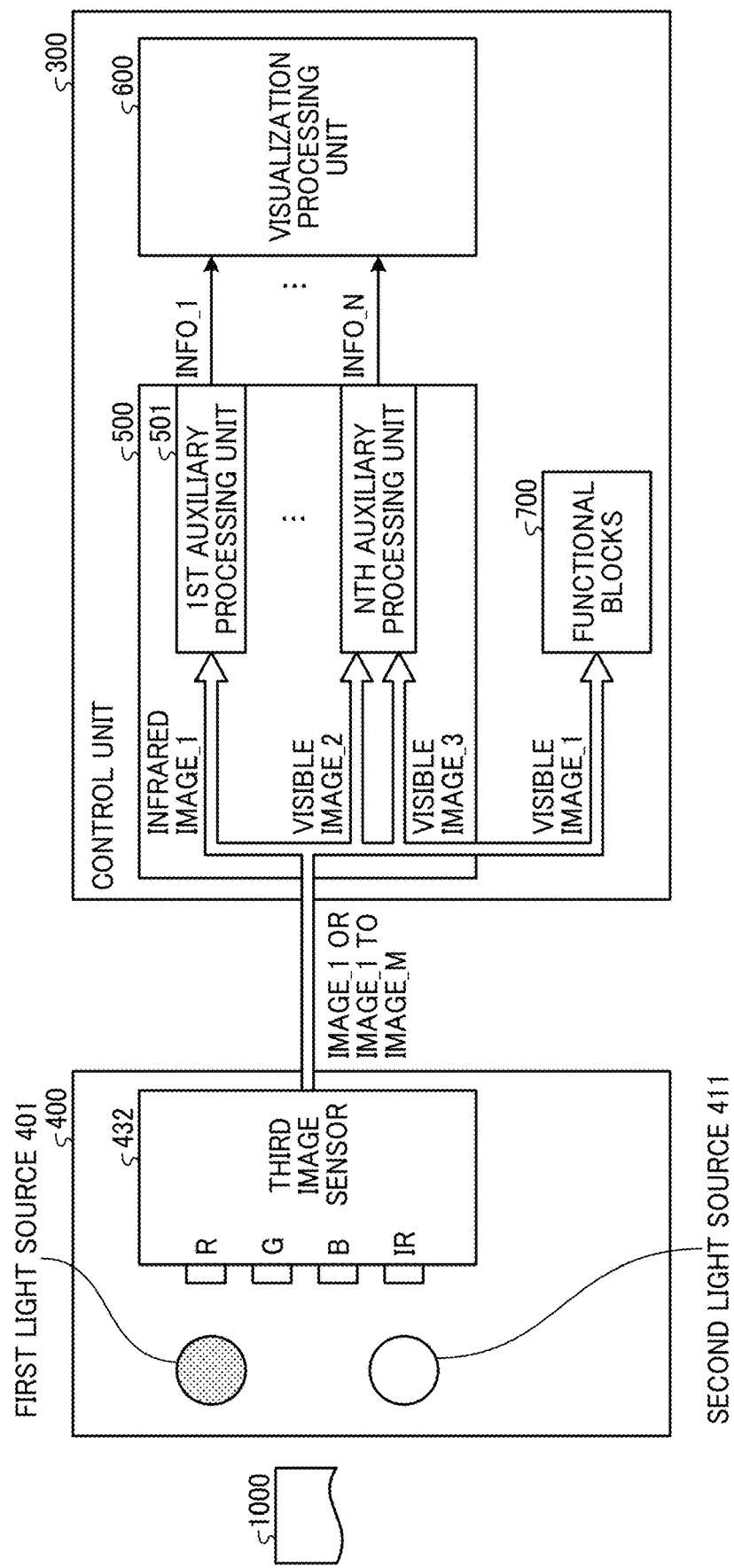
FIG. 22 is a diagram illustrating an example of an apparatus configuration according to an eighth modification.

FIG. 22 is a diagram illustrating an example of an apparatus configuration according to an eighth modification. In the apparatus configuration illustrated in FIG. 22, the extraction processing unit 500 performs fraud confirmation processing using an invisible image and a visible image output from the third image sensor 432. In the example illustrated in FIG. 22, one of the first to Nth auxiliary processing units 501 performs fraud confirmation processing using one image (infrared image_1) among infrared images. Another one of the first to Nth auxiliary processing units 501, that is, the Nth auxiliary processing unit in this example, performs fraud confirmation processing using two images (a visible image_1 and a visible image_2) in visible images.

Figure 23A:
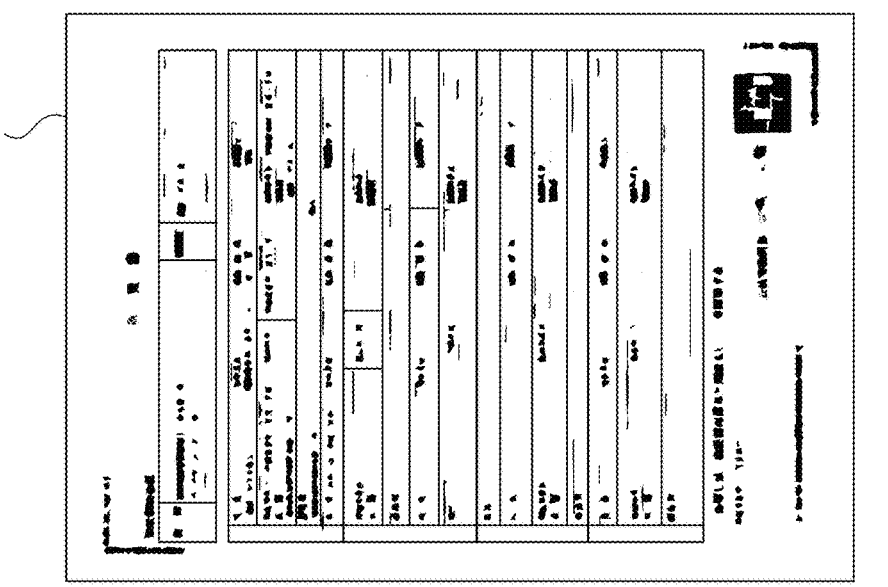
FIGS. 23A, 23B, and 23C are illustrations of fraud confirmation processing using an invisible image and a visible image.
Figure 23B:
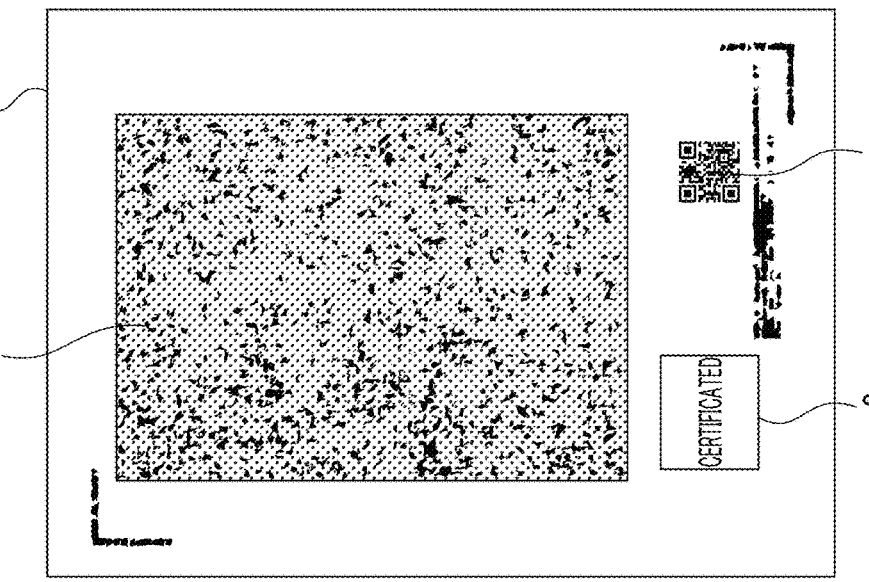
Figure 23C:
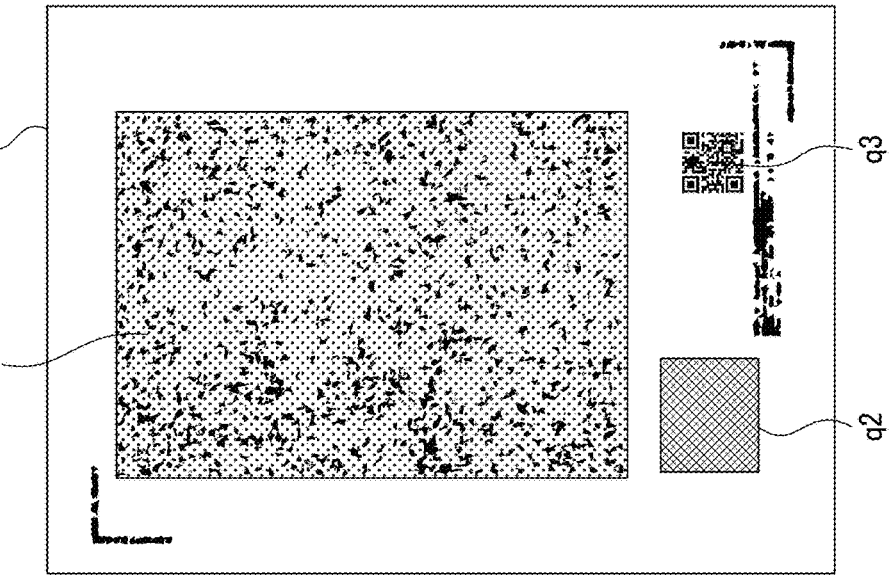

FIGS. 23A, 23B, and 23C are illustrations of fraud confirmation processing using an invisible image and a visible image. FIG. 23A illustrates an example of the configuration of a back side 1000-2 of the printing surface 1000. FIG. 23B illustrates an example of an infrared image 2020 of the back side 1000-2. The configuration and infrared image of the back side 1000-2 are the same as those described in the fourth modification. When the front side 1000-1 of the printing surface 1000 is printed with black ink, the printed content of the front side 1000-1 is read as black in both a visible image and an infrared image, and the same reading result is obtained. Accordingly, as illustrated in FIG. 23C, the visible image 2022 of the front side 1000-1 is equivalent as information. Such a configuration allows selective use of the visible image and the invisible image, thus allowing fraud confirmation processing to be performed even by using the visible image 2022.

Ninth Modification

One light source (third light source) capable of emitting light in both wavelength regions of a visible light source and an invisible light source (infrared light) may be used.

Figure 24:
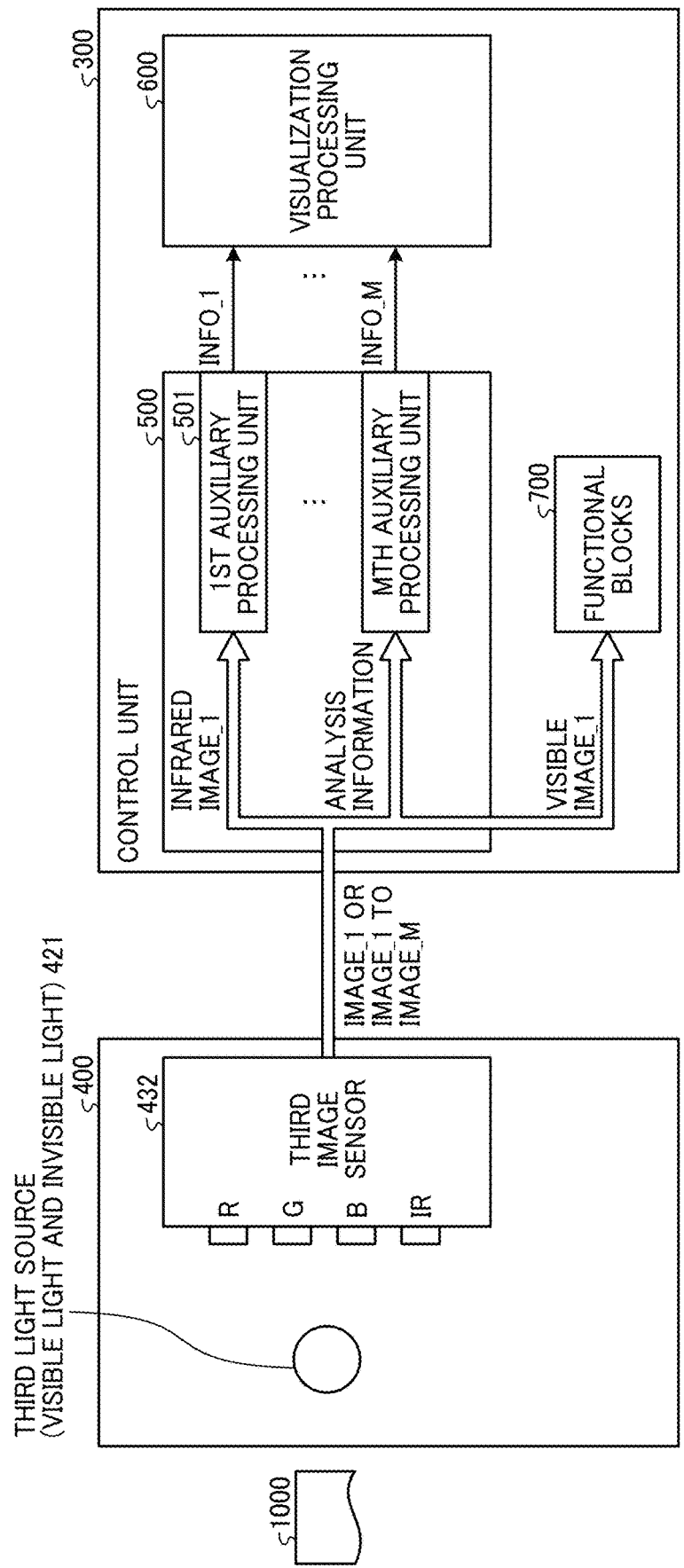
FIG. 24 is a diagram illustrating an example of an apparatus configuration according to a ninth modification.

FIG. 24 is a diagram illustrating an example of an apparatus configuration according to a ninth modification. In the apparatus configuration of FIG. 24, the first light source and the second light source are changed to a third light source 421 that is a physically single light source. Such a configuration can further reduce the size of the apparatus.

Tenth Modification

For example, if an encryption/decryption method of an image of important information is locally present in a fraud confirmation device, there is a risk that the method itself might be analyzed and leaked, thereby enabling an outsider to forge a document. In a tenth modification, given auxiliary processing (for example, Nth auxiliary processing) is executed by an information processing apparatus (corresponding to an "external apparatus") such as a server apparatus on a network. Note that the number of functional unit for the auxiliary processing provided in the information processing apparatus is not limited to one, and may be two or more.

Figure 25:
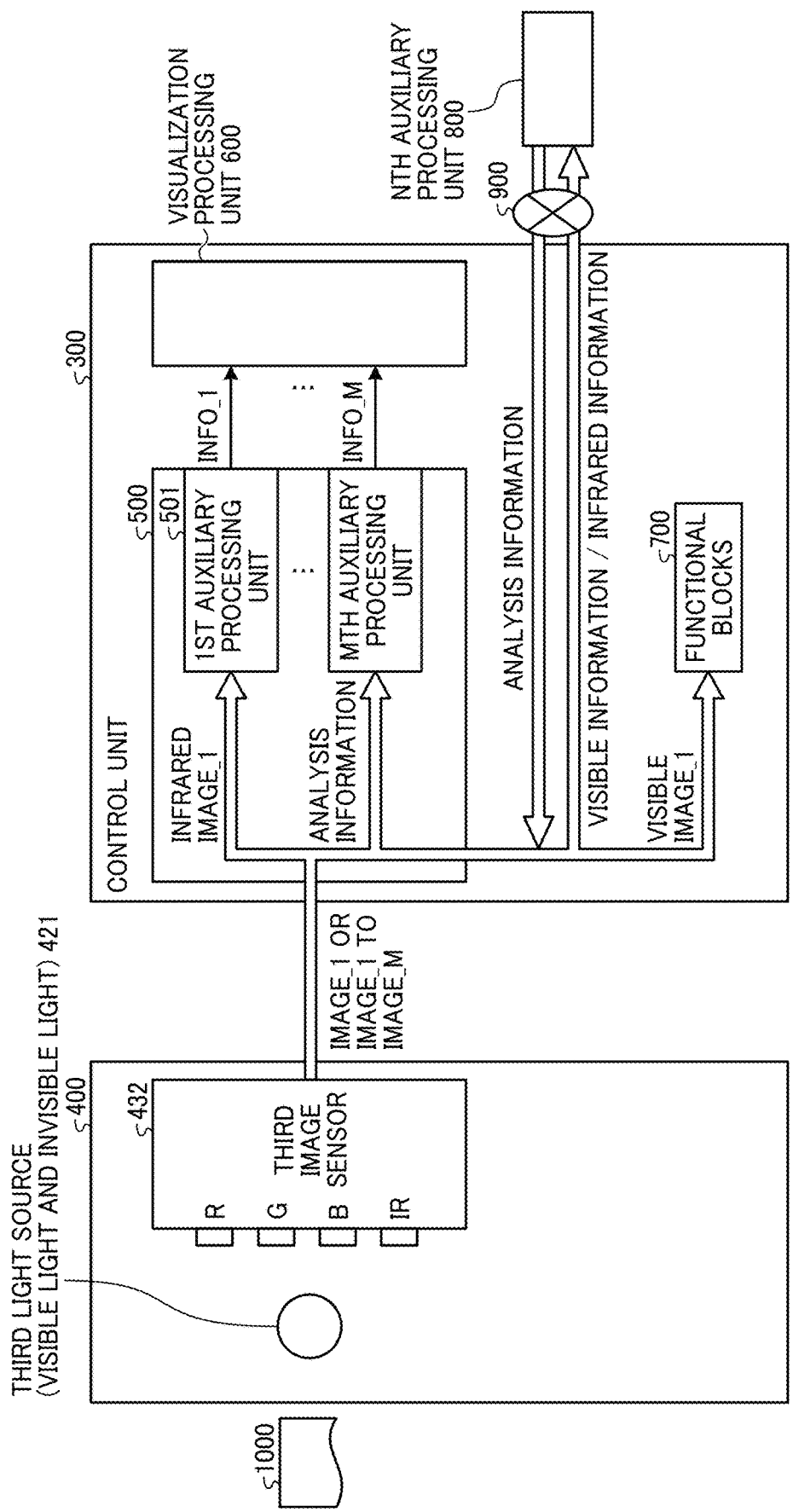
FIG. 25 is a diagram illustrating an example of an apparatus configuration according to a tenth modification.

FIG. 25 is a diagram illustrating an example of an apparatus configuration according to the tenth modification. In the apparatus configuration of FIG. 25, an Nth auxiliary processing unit is provided in an information processing apparatus 800 that is provided outside the image reading apparatus 1. One or a plurality of auxiliary processing units 500-1 included in the extraction processing unit 500 requests the information processing apparatus 800 to perform analysis via a network 900. The Nth auxiliary processing unit of the information processing apparatus 800 performs analysis processing using information (visible information or infrared information) to be analyzed transmitted from the image reading apparatus 1 and transmits an analysis result to the image reading apparatus 1. That is, the auxiliary processing unit 500-1 acquires an analysis result, which is a part of the determination information, from the information processing apparatus 800, and uses the analysis result for fraud confirmation. On the network 900, information is transmitted as an image in which the information is encoded or embedded, and information analysis is performed on a server or the like. Thereafter, the analyzed information is transmitted to the image reading apparatus 1 again and used for fraud confirmation. The analyzed information may be directly transmitted to the visualization processing unit 600.

For example, in the processing of a scrambled image, an encryption key is transmitted to a specific Web site to decrypt the scrambled image, and thus the decrypted image is acquired. In this case, the encryption key is decoded from a QR code, and the encryption key and the scrambled image are transmitted to the Web site. The Web site uses the encryption key and the scrambled image to decrypt the scrambled image and returns information of the decryption result.

The configuration of the tenth modification can achieve both confidentiality and facilitation of fraud confirmation, in particular, in a document in which confidentiality of information such as personal information is important.

Second Embodiment

Figure 26:
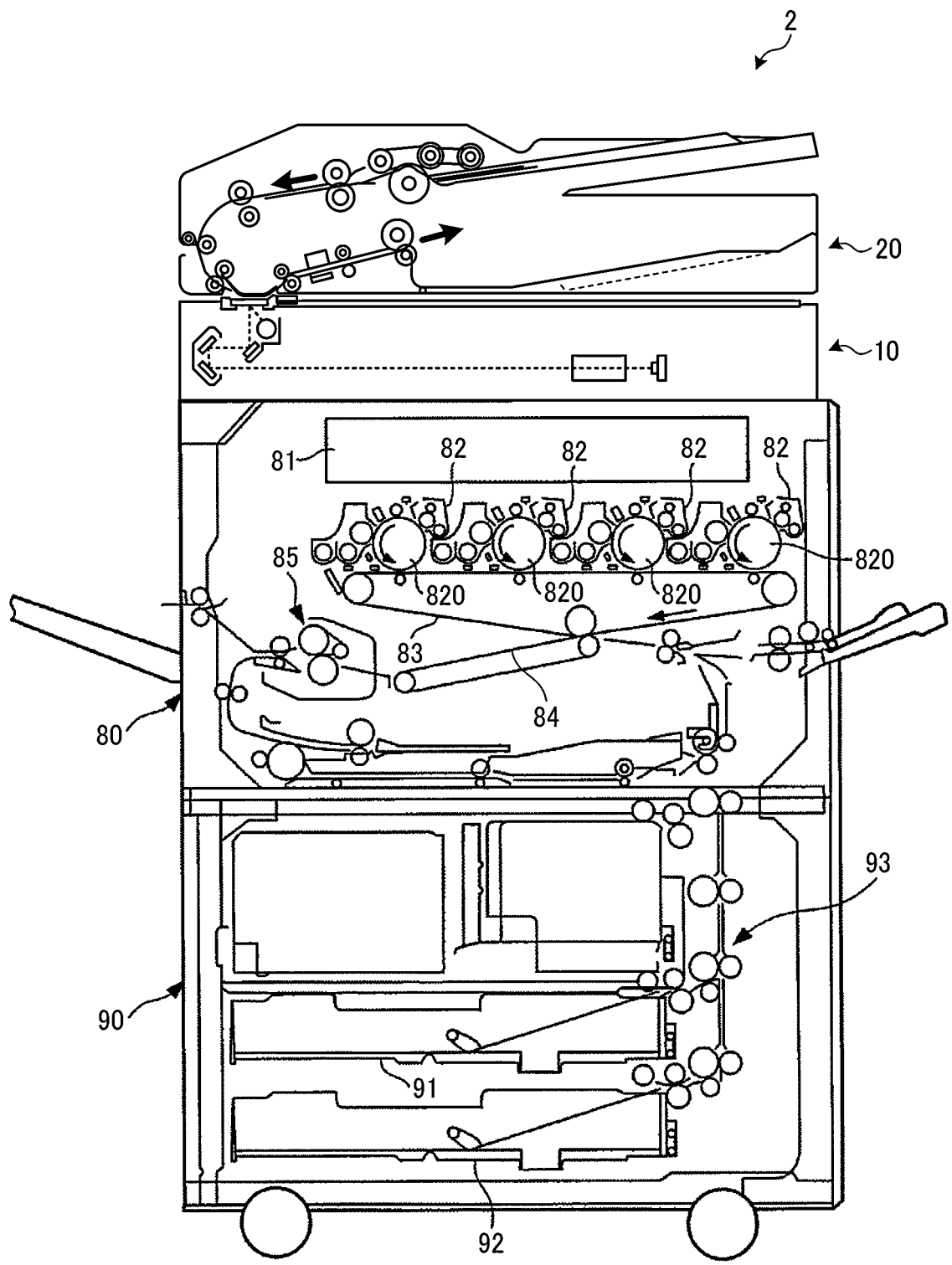
FIG. 26 is a diagram illustrating an example of a configuration of a fraud confirmation assisting apparatus according to a second embodiment of the present disclosure.

FIG. 26 is a diagram illustrating an example of a configuration of an fraud confirmation assisting apparatus according to a second embodiment of the present disclosure. FIG. 26 illustrates an image forming apparatus 2 generally referred to as a multi-function peripheral (MFP), which is an example of a fraud confirmation assisting apparatus. The image forming apparatus 2 illustrated in FIG. 26 includes an image reading apparatus (an image reading apparatus main body 10 and an ADF 20) in an upper portion. Since the configuration of the image reading apparatus is the same as that of the first embodiment, the description of the configuration of the image reading apparatus is omitted here.

The image forming apparatus 2 illustrated in FIG. 26 includes an image forming section 80 and a sheet feeding section 90 below the image reading apparatus main body 10. The image forming apparatus 2 prints an output image based on a read image, which is read by the image reading apparatus main body 10, on a recording sheet of paper (an example of a "recording medium") by the image forming section 80. The output image is, for example, a visible image processed by the various functional blocks 700 or an invisible image processed by the visualization processing unit 600.

The image forming section 80 includes, for example, an optical writing device 81, tandem image forming units 82 of yellow (Y), magenta (M), cyan (C), and black (K) serving as image forming devices, an intermediate transfer belt 83, and a secondary transfer belt 84. In the image forming section 80, the optical writing device 81 writes an image to be printed on a photoconductive drum 820 of each image forming unit 82, and a toner image of each color plate is transferred from each photoconductive drum 820 onto the intermediate transfer belt 83. The K plate is formed of a K toner containing carbon black.

In the example illustrated in FIG. 26, the image forming units 82 of Y, M, C, and K include four rotatable photoconductive drums 820 of Y, M, C, and K, respectively. In each image forming unit 82, image forming elements including a charging roller, a developing device, a primary transfer roller, a cleaner unit, and a static eliminator are provided around the photoconductive drum 820. Around each photoconductive drum 820, the image forming elements operate in a predetermined image forming process to form an image on each photoconductive drum 820. The image formed on each photoconductive drum 820 is transferred as a toner image onto the intermediate transfer belt 83 by the primary transfer roller.

The intermediate transfer belt 83 is in the nips between the photoconductor drums 820 and the corresponding primary transfer rollers and is stretched by a drive roller and driven rollers. The toner image primarily transferred onto the intermediate transfer belt 83 is secondarily transferred onto the recording sheet on the secondary transfer belt 84 by a secondary transfer device as the intermediate transfer belt 83 runs. As the secondary transfer belt 84 travels, the recording sheet is conveyed to a fixing device 85, where the toner image is fixed as a color image on the recording sheet. Finally, the recording medium is discharged onto an output tray disposed outside a housing of the image forming apparatus 2.

For example, the sheet feeding section 90 feeds a predetermined recording sheet from sheet trays 91 and 92 storing recording sheets having different sheet sizes, and a conveyor 93 including various rollers conveys the recording sheet to the secondary transfer belt 84.

The image forming section 80 is not limited to the one that forms an image by an electrophotographic method as described above, and may be one that forms an image by, for example, an inkjet method.

For example, an issue certificate of a convenience store or the like may be provided with two types of fraud prevention means as described above and has high security. However, it is necessary to transmit and receive an image to and from a designated Web site after the image is captured by an image reading apparatus, and confirmation by an infrared camera (drive recorder or the like) is also necessary. Accordingly, confirmation takes a lot of time and effort. The configuration described in the present embodiment allows a plurality of types of fraud confirmation to be easily performed from one read image obtained by reading such a document.

In the above description, some embodiments and modifications of the embodiments are described in the present disclosure. However, the above-described embodiments and modifications are described as examples and are not intended to limit the scope of the present disclosure. The novel embodiments described herein may be embodied in a variety of other forms. Furthermore, various omissions, substitutions and changes in the form of the embodiments described herein may be made without departing from the gist of the inventions. The embodiments and modifications or variations thereof are included in the scope and the gist of the invention, and are included in the invention described in the claims and the equivalent scopes thereof.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A fraud confirmation assisting apparatus, comprising:
a light source configured to irradiate an object to be read with light in at least an invisible wavelength range; and
a reading sensor having sensitivity at least in the invisible wavelength range;
processing circuitry configured to:
perform a reading operation on the object to be read by a combination of the light source and the reading sensor;
output a plurality of pieces of fraud confirmation information based on read information output from the reading sensor by the reading operation;
convert information included in the read information into determination information for determining a plurality of frauds on the object to be read, wherein the plurality of frauds include forgery and tampering; and
visualize the determination information converted and output the visualized determination information as the fraud confirmation information.

2. The fraud confirmation assisting apparatus according to claim 1,
wherein the processing circuitry is configured to output, as the plurality of pieces of fraud confirmation information, original information that is included in the object to be read and is readable in both a visible wavelength range and the invisible wavelength range, and comparison information that is to be compared with the original information and is readable in the invisible wavelength range.

3. The fraud confirmation assisting apparatus according to claim 1,
wherein the processing circuitry is configured to acquire a part of the determination information from an external apparatus via a network.

4. The fraud confirmation assisting apparatus according to claim 1,
wherein the processing circuitry is configured to:
convert first information included in the read information into first determination information for determining a first fraud on the object to be read; and
convert second information included in the read information, the second information being different from the first information, into second determination information for determining a second fraud on the object to be read.

5. The fraud confirmation assisting apparatus according to claim 1,
wherein the processing circuitry is configured to determine one fraud for the object to be read, using a plurality of pieces of information included in the read information.

6. The fraud confirmation assisting apparatus according to claim 5,
wherein the light in the invisible wavelength range included in the light source is infrared light, and
wherein the reading sensor has sensitivity to at least an infrared wavelength region of the infrared light.

7. The fraud confirmation assisting apparatus according to claim 1,
wherein one of the plurality of pieces of fraud confirmation information is information indicating forgery of the object to be read, and another one of the plurality of pieces of fraud confirmation information is information indicating tampering of the object to be read.

8. The fraud confirmation assisting apparatus according to claim 1, further comprising:
another light source configured to irradiate the object to be read with light in a visible wavelength range; and
another reading sensor having sensitivity in the visible wavelength range,
wherein the processing circuitry is further configured to perform a visible information reading operation on the object to be read, using a combination of said another light source and said another reading sensor.

9. The fraud confirmation assisting apparatus according to claim 8,
wherein the reading sensor and said another reading sensor are configured as a physically single reading sensor.

10. The fraud confirmation assisting apparatus according to claim 9,
wherein the physically single reading sensor includes a light receiver configured to receive light in an invisible wavelength range and another light receiver configured to receive light in a visible wavelength range.

11. The fraud confirmation assisting apparatus according to claim 8,
wherein the light source and said another light source are provided as a physically single light source.

12. The fraud confirmation assisting apparatus according to claim 1, further comprising a drum to form an image on a recording medium, based on the read information obtained by the reading operation on the object to be read.

13. The fraud confirmation assisting apparatus according to claim 1,
wherein the processing circuitry is configured to acquire the read information by a single reading operation of the object to be read using at least the light source and the reading sensor.

14. A fraud confirmation method for confirming a fraud on an object to be read, the fraud confirmation method comprising:
irradiating the object to be read with light in at least an invisible wavelength range;
acquiring reading information of the invisible wavelength range of the object to be read by a reading sensor having sensitivity at least in the invisible wavelength range;
outputting a plurality of pieces of fraud confirmation information based on the read information;
converting information included in the read information into determination information for determining a plurality of frauds on the object to be read, wherein the plurality of frauds include forgery and tampering; and
visualizing the determination information converted and output the visualized determination information as the fraud confirmation information.

15. The fraud confirmation method of claim 14, further comprising:
converting first information included in the read information into first determination information for determining a first fraud on the object to be read; and
converting second information included in the read information, the second information being different from the first information, into second determination information for determining a second fraud on the object to be read.

16. The fraud confirmation method of claim 14,
wherein one of the plurality of pieces of fraud confirmation information is information indicating forgery of the object to be read, and another one of the plurality of pieces of fraud confirmation information is information indicating tampering of the object to be read.

* * * * *